(12) United States Patent  (10) Patent No.: US 8,429,220 B2
Wilkinson et al.  (45) Date of Patent: Apr. 23, 2013

(54) DATA EXCHANGE AMONG DATA SOURCES

(75) Inventors: David Wilkinson, Austin, TX (US); Scott Schumacher, Northridge, CA (US); Martin E. Moseley, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 576 days.

(21) Appl. No.: 12/058,157

(22) Filed: Mar. 28, 2008

(65) Prior Publication Data

US 2008/0244008 A1  Oct. 2, 2008

Related U.S. Application Data

(60) Provisional application No. 60/920,739, filed on Mar. 29, 2007.

(51) Int. Cl.
*G06F 15/16* (2006.01)
*G06F 15/173* (2006.01)
*G06F 15/177* (2006.01)

(52) U.S. Cl.
USPC .......... 709/202; 709/201; 709/205; 709/217; 709/218; 709/219

(58) Field of Classification Search .............. 709/201, 709/202, 205, 217, 218, 219
See application file for complete search history.

(56) References Cited

U.S. PATENT DOCUMENTS

| 4,531,186 | A | 7/1985 | Knapman |
|---|---|---|---|
| 5,020,019 | A | 5/1991 | Ogawa |
| 5,134,564 | A | 7/1992 | Dunn et al. |
| 5,247,437 | A | 9/1993 | Vale et al. |
| 5,321,833 | A | 6/1994 | Chang et al. |
| 5,323,311 | A | 6/1994 | Fukao et al. |
| 5,333,317 | A | 7/1994 | Dann |

(Continued)

FOREIGN PATENT DOCUMENTS

| WO | 9855947 A1 | 12/1998 |
|---|---|---|
| WO | 0159586 A2 | 8/2001 |

(Continued)

OTHER PUBLICATIONS

International Search Report and Written Opinion Mailed Aug. 28, 2008 for Application No. PCT/US2008/58665 (7 pp.).

(Continued)

*Primary Examiner* — Carl Colin
*Assistant Examiner* — Chau Le
(74) *Attorney, Agent, or Firm* — Elissa Y. Wang; Edell, Shapiro & Finnan, LLC

(57) ABSTRACT

Systems and methods for joining results in loosely collaborative data exchanges which include a plurality of nodes in communication with each other wherein a node is constrained from sharing payload data regarding a first subject, is allowed to share matching data regarding the first subject, and is further constrained to be separate from the other nodes. In some embodiments, a method includes receiving a set of virtual results from the constrained node including the matching data and excluding the payload data. The method also includes receiving results from the other nodes and determining whether any of the results correspond to the same subject. The method also includes, when any of the results correspond to the same subject, joining the corresponding portions in a hub separate from the constrained node. The joined results can be output.

34 Claims, 15 Drawing Sheets

U.S. PATENT DOCUMENTS

| | | | |
|---|---|---|---|
| 5,381,332 A | 1/1995 | Wood | |
| 5,442,782 A | 8/1995 | Malatesta et al. | |
| 5,497,486 A | 3/1996 | Stolfo et al. | |
| 5,535,322 A | 7/1996 | Hecht | |
| 5,535,382 A | 7/1996 | Ogawa | |
| 5,537,590 A | 7/1996 | Amado | |
| 5,555,409 A | 9/1996 | Leenstra et al. | |
| 5,561,794 A | 10/1996 | Fortier | |
| 5,583,763 A | 12/1996 | Atcheson et al. | |
| 5,600,835 A | 2/1997 | Garland et al. | |
| 5,606,690 A | 2/1997 | Hunter et al. | |
| 5,615,367 A | 3/1997 | Bennett et al. | |
| 5,640,553 A | 6/1997 | Schultz | |
| 5,651,108 A | 7/1997 | Cain et al. | |
| 5,675,752 A | 10/1997 | Scott et al. | |
| 5,675,753 A | 10/1997 | Hansen et al. | |
| 5,694,593 A | 12/1997 | Baclawski | |
| 5,694,594 A | 12/1997 | Chang | |
| 5,710,916 A | 1/1998 | Barbara et al. | |
| 5,734,907 A | 3/1998 | Jarossay et al. | |
| 5,765,150 A | 6/1998 | Burrows | |
| 5,774,661 A | 6/1998 | Chatterjee | |
| 5,774,883 A | 6/1998 | Anderson | |
| 5,774,887 A | 6/1998 | Wolff et al. | |
| 5,778,370 A | 7/1998 | Emerson | |
| 5,787,431 A | 7/1998 | Shaughnessy | |
| 5,787,470 A | 7/1998 | DeSimone et al. | |
| 5,790,173 A | 8/1998 | Strauss | |
| 5,796,393 A | 8/1998 | MacNaughton et al. | |
| 5,805,702 A | 9/1998 | Curry | |
| 5,809,499 A | 9/1998 | Wong et al. | |
| 5,819,264 A | 10/1998 | Palmon et al. | |
| 5,835,712 A | 11/1998 | DuFresne | |
| 5,835,912 A | 11/1998 | Pet | |
| 5,848,271 A | 12/1998 | Caruso et al. | |
| 5,859,972 A | 1/1999 | Subramaniam et al. | |
| 5,862,322 A | 1/1999 | Anglin et al. | |
| 5,862,325 A | 1/1999 | Reed et al. | |
| 5,878,043 A | 3/1999 | Casey | |
| 5,893,074 A | 4/1999 | Hughes et al. | |
| 5,893,110 A | 4/1999 | Weber et al. | |
| 5,905,496 A | 5/1999 | Lau et al. | |
| 5,930,768 A | 7/1999 | Hooban | |
| 5,960,411 A | 9/1999 | Hartman et al. | |
| 5,963,915 A | 10/1999 | Kirsch | |
| 5,987,422 A | 11/1999 | Buzsaki | |
| 5,991,758 A * | 11/1999 | Ellard | 709/206 |
| 5,999,937 A | 12/1999 | Ellard | |
| 6,014,664 A | 1/2000 | Fagin et al. | |
| 6,016,489 A | 1/2000 | Cavanaugh et al. | |
| 6,018,733 A | 1/2000 | Kirsch et al. | |
| 6,018,742 A | 1/2000 | Herbert, III | |
| 6,026,433 A | 2/2000 | D'Arlach et al. | |
| 6,049,847 A | 4/2000 | Vogt et al. | |
| 6,067,549 A | 5/2000 | Smalley et al. | |
| 6,069,628 A | 5/2000 | Farry et al. | |
| 6,078,325 A | 6/2000 | Jolissaint et al. | |
| 6,108,004 A | 8/2000 | Medl | |
| 6,134,581 A | 10/2000 | Ismael et al. | |
| 6,185,608 B1 | 2/2001 | Hon et al. | |
| 6,223,145 B1 | 4/2001 | Hearst | |
| 6,269,373 B1 | 7/2001 | Apte et al. | |
| 6,297,824 B1 | 10/2001 | Hearst et al. | |
| 6,298,478 B1 | 10/2001 | Nally et al. | |
| 6,311,190 B1 | 10/2001 | Bayer et al. | |
| 6,327,611 B1 | 12/2001 | Everingham | |
| 6,330,569 B1 | 12/2001 | Baisley et al. | |
| 6,356,931 B2 | 3/2002 | Ismael et al. | |
| 6,374,241 B1 | 4/2002 | Lamburt et al. | |
| 6,385,600 B1 | 5/2002 | McGuinness et al. | |
| 6,389,429 B1 | 5/2002 | Kane et al. | |
| 6,446,188 B1 | 9/2002 | Henderson et al. | |
| 6,449,620 B1 | 9/2002 | Draper | |
| 6,457,065 B1 | 9/2002 | Rich et al. | |
| 6,460,045 B1 | 10/2002 | Aboulnaga et al. | |
| 6,496,793 B1 | 12/2002 | Veditz et al. | |
| 6,502,099 B1 | 12/2002 | Rampy et al. | |
| 6,510,505 B1 | 1/2003 | Burns et al. | |
| 6,523,019 B1 | 2/2003 | Borthwick | |
| 6,529,888 B1 | 3/2003 | Heckerman et al. | |
| 6,556,983 B1 | 4/2003 | Altschuler et al. | |
| 6,557,100 B1 | 4/2003 | Knutson | |
| 6,621,505 B1 | 9/2003 | Beauchamp et al. | |
| 6,633,878 B1 | 10/2003 | Underwood | |
| 6,633,882 B1 | 10/2003 | Fayyad et al. | |
| 6,633,992 B1 | 10/2003 | Rosen | |
| 6,647,383 B1 | 11/2003 | August et al. | |
| 6,662,180 B1 | 12/2003 | Aref et al. | |
| 6,687,702 B2 | 2/2004 | Vaitheeswaran et al. | |
| 6,704,805 B1 | 3/2004 | Acker et al. | |
| 6,718,535 B1 | 4/2004 | Underwood | |
| 6,742,003 B2 | 5/2004 | Heckerman et al. | |
| 6,757,708 B1 | 6/2004 | Craig et al. | |
| 6,795,793 B2 | 9/2004 | Shayegan et al. | |
| 6,807,537 B1 | 10/2004 | Thiesson et al. | |
| 6,842,761 B2 | 1/2005 | Diamond et al. | |
| 6,842,906 B1 | 1/2005 | Bowman-Amuah | |
| 6,879,944 B1 | 4/2005 | Tipping et al. | |
| 6,907,422 B1 | 6/2005 | Predovic | |
| 6,912,549 B2 | 6/2005 | Rotter et al. | |
| 6,922,695 B2 | 7/2005 | Skufca et al. | |
| 6,957,186 B1 | 10/2005 | Guheen et al. | |
| 6,990,636 B2 | 1/2006 | Beauchamp et al. | |
| 6,996,565 B2 | 2/2006 | Skufca et al. | |
| 7,035,809 B2 | 4/2006 | Miller et al. | |
| 7,043,476 B2 | 5/2006 | Robson | |
| 7,099,857 B2 | 8/2006 | Lambert | |
| 7,143,091 B2 | 11/2006 | Charnock et al. | |
| 7,155,427 B1 | 12/2006 | Prothia | |
| 7,181,459 B2 | 2/2007 | Grant et al. | |
| 7,249,131 B2 | 7/2007 | Skufca et al. | |
| 7,330,845 B2 | 2/2008 | Lee et al. | |
| 7,487,173 B2 | 2/2009 | Medicke et al. | |
| 7,526,486 B2 | 4/2009 | Cushman, II et al. | |
| 7,567,962 B2 | 7/2009 | Chakrabarti et al. | |
| 7,620,647 B2 | 11/2009 | Stephens et al. | |
| 7,627,550 B1 | 12/2009 | Adams et al. | |
| 7,685,093 B1 | 3/2010 | Adams et al. | |
| 7,698,268 B1 | 4/2010 | Adams et al. | |
| 7,788,274 B1 | 8/2010 | Ionescu | |
| 8,321,383 B2 | 11/2012 | Schumacher et al. | |
| 8,321,393 B2 | 11/2012 | Adams et al. | |
| 8,332,366 B2 | 12/2012 | Schumacher et al. | |
| 2002/0007284 A1 | 1/2002 | Schurenberg et al. | |
| 2002/0073099 A1 | 6/2002 | Gilbert et al. | |
| 2002/0080187 A1 | 6/2002 | Lawton | |
| 2002/0087599 A1 | 7/2002 | Grant et al. | |
| 2002/0095421 A1 | 7/2002 | Koskas | |
| 2002/0099694 A1 | 7/2002 | Diamond et al. | |
| 2002/0152422 A1 | 10/2002 | Sharma et al. | |
| 2002/0156917 A1 * | 10/2002 | Nye | 709/238 |
| 2002/0178360 A1 | 11/2002 | Wenocur et al. | |
| 2003/0004770 A1 | 1/2003 | Miller et al. | |
| 2003/0004771 A1 | 1/2003 | Yaung | |
| 2003/0018652 A1 | 1/2003 | Heckerman et al. | |
| 2003/0023773 A1 | 1/2003 | Lee et al. | |
| 2003/0051063 A1 | 3/2003 | Skufca et al. | |
| 2003/0065826 A1 | 4/2003 | Skufca et al. | |
| 2003/0065827 A1 | 4/2003 | Skufca et al. | |
| 2003/0105825 A1 | 6/2003 | Kring et al. | |
| 2003/0120630 A1 | 6/2003 | Tunkelang | |
| 2003/0145002 A1 | 7/2003 | Kleinberger et al. | |
| 2003/0158850 A1 | 8/2003 | Lawrence et al. | |
| 2003/0174179 A1 | 9/2003 | Suermondt et al. | |
| 2003/0182101 A1 | 9/2003 | Lambert | |
| 2003/0195836 A1 | 10/2003 | Hayes et al. | |
| 2003/0195889 A1 | 10/2003 | Yao et al. | |
| 2003/0195890 A1 | 10/2003 | Oommen | |
| 2003/0220858 A1 | 11/2003 | Lam et al. | |
| 2003/0227487 A1 | 12/2003 | Hugh | |
| 2004/0107189 A1 | 6/2004 | Burdick et al. | |
| 2004/0107205 A1 | 6/2004 | Burdick et al. | |
| 2004/0122790 A1 | 6/2004 | Walker et al. | |
| 2004/0143477 A1 | 7/2004 | Wolff | |
| 2004/0143508 A1 | 7/2004 | Bohn et al. | |
| 2004/0181526 A1 | 9/2004 | Burdick et al. | |
| 2004/0181554 A1 | 9/2004 | Heckerman et al. | |

| | | |
|---|---|---|
| 2004/0220926 A1 | 11/2004 | Lamkin et al. |
| 2004/0260694 A1 | 12/2004 | Chaudhuri et al. |
| 2005/0004895 A1 | 1/2005 | Schurenberg et al. |
| 2005/0015381 A1 | 1/2005 | Clifford et al. |
| 2005/0015675 A1 | 1/2005 | Kolawa et al. |
| 2005/0050068 A1 | 3/2005 | Vaschillo et al. |
| 2005/0055345 A1 | 3/2005 | Ripley |
| 2005/0060286 A1 | 3/2005 | Hansen et al. |
| 2005/0071194 A1 | 3/2005 | Bormann et al. |
| 2005/0075917 A1 | 4/2005 | Flores et al. |
| 2005/0114369 A1 | 5/2005 | Gould et al. |
| 2005/0149522 A1 | 7/2005 | Cookson et al. |
| 2005/0154615 A1 | 7/2005 | Rotter et al. |
| 2005/0210007 A1 | 9/2005 | Beres et al. |
| 2005/0228808 A1 | 10/2005 | Mamou et al. |
| 2005/0240392 A1 | 10/2005 | Munro et al. |
| 2005/0256740 A1 | 11/2005 | Kohan et al. |
| 2005/0256882 A1 | 11/2005 | Able et al. |
| 2005/0273452 A1 | 12/2005 | Molloy et al. |
| 2006/0053151 A1 | 3/2006 | Gardner et al. |
| 2006/0053172 A1 | 3/2006 | Gardner et al. |
| 2006/0053173 A1 | 3/2006 | Gardner et al. |
| 2006/0053382 A1 | 3/2006 | Gardner et al. |
| 2006/0064429 A1 | 3/2006 | Yao |
| 2006/0074832 A1 | 4/2006 | Gardner et al. |
| 2006/0074836 A1 | 4/2006 | Gardner et al. |
| 2006/0080312 A1 | 4/2006 | Friedlander et al. |
| 2006/0116983 A1 | 6/2006 | Dettinger et al. |
| 2006/0117032 A1 | 6/2006 | Dettinger et al. |
| 2006/0129605 A1 | 6/2006 | Doshi |
| 2006/0129971 A1 | 6/2006 | Rojer |
| 2006/0136205 A1 | 6/2006 | Song |
| 2006/0161522 A1 | 7/2006 | Dettinger et al. |
| 2006/0167896 A1 | 7/2006 | Kapur et al. |
| 2006/0179050 A1 | 8/2006 | Giang et al. |
| 2006/0190445 A1 | 8/2006 | Risberg et al. |
| 2006/0195560 A1 | 8/2006 | Newport |
| 2006/0265400 A1 | 11/2006 | Fain et al. |
| 2006/0271401 A1* | 11/2006 | Lassetter et al. ............ 705/2 |
| 2006/0271549 A1 | 11/2006 | Rayback et al. |
| 2006/0287890 A1 | 12/2006 | Stead et al. |
| 2007/0005567 A1 | 1/2007 | Hermansen et al. |
| 2007/0016450 A1 | 1/2007 | Bhora et al. |
| 2007/0055647 A1 | 3/2007 | Mullins et al. |
| 2007/0067285 A1 | 3/2007 | Blume et al. |
| 2007/0073678 A1 | 3/2007 | Scott et al. |
| 2007/0073745 A1 | 3/2007 | Scott et al. |
| 2007/0094060 A1 | 4/2007 | Apps et al. |
| 2007/0150279 A1 | 6/2007 | Gandhi et al. |
| 2007/0192715 A1 | 8/2007 | Kataria et al. |
| 2007/0198481 A1 | 8/2007 | Hogue et al. |
| 2007/0198600 A1 | 8/2007 | Betz |
| 2007/0214129 A1 | 9/2007 | Ture et al. |
| 2007/0214179 A1 | 9/2007 | Hoang |
| 2007/0217676 A1 | 9/2007 | Grauman et al. |
| 2007/0250487 A1 | 10/2007 | Reuther |
| 2007/0260492 A1 | 11/2007 | Feied et al. |
| 2007/0276844 A1 | 11/2007 | Segal et al. |
| 2007/0276858 A1 | 11/2007 | Cushman et al. |
| 2007/0299697 A1 | 12/2007 | Friedlander et al. |
| 2007/0299842 A1 | 12/2007 | Morris et al. |
| 2008/0005106 A1 | 1/2008 | Schumacher |
| 2008/0016218 A1 | 1/2008 | Jones et al. |
| 2008/0069132 A1 | 3/2008 | Ellard et al. |
| 2008/0120432 A1 | 5/2008 | Lamoureux et al. |
| 2008/0126160 A1 | 5/2008 | Takuechi et al. |
| 2008/0243832 A1 | 10/2008 | Adams et al. |
| 2008/0243885 A1 | 10/2008 | Harger et al. |
| 2009/0089317 A1 | 4/2009 | Ford et al. |
| 2009/0089332 A1 | 4/2009 | Harger et al. |
| 2009/0089630 A1 | 4/2009 | Goldenberg et al. |
| 2009/0198686 A1 | 8/2009 | Cushman, II et al. |
| 2010/0114877 A1 | 5/2010 | Adams et al. |
| 2010/0174725 A1 | 7/2010 | Adams et al. |
| 2010/0175024 A1 | 7/2010 | Schumacher et al. |
| 2011/0010214 A1 | 1/2011 | Carruth |
| 2011/0010346 A1 | 1/2011 | Goldenberg et al. |
| 2011/0010401 A1 | 1/2011 | Adams et al. |
| 2011/0010728 A1 | 1/2011 | Goldenberg et al. |
| 2011/0047044 A1 | 2/2011 | Wright et al. |
| 2011/0191349 A1 | 8/2011 | Ford et al. |

FOREIGN PATENT DOCUMENTS

| | | | |
|---|---|---|---|
| WO | 0175679 | A1 | 10/2001 |
| WO | 03021485 | | 3/2003 |
| WO | 2004023297 | A1 | 3/2004 |
| WO | 2004023311 | A1 | 3/2004 |
| WO | 2004023345 | A1 | 3/2004 |
| WO | 2009042931 | A1 | 4/2009 |
| WO | 2009042941 | A1 | 4/2009 |
| WO | 0159586 | | 8/2011 |

OTHER PUBLICATIONS

International Preliminary Report on Patentability Under Chapter I for PCT Application No. PCT/US2008/058665, issued Sep. 29, 2009, mailed Oct. 8, 2009, 6 pgs.
Fair, "Record Linkage in the National Dose Registry of Canada", European Journal of Cancer, vol. 3, Supp. 3, pp. S37-S43, XP005058648 ISSN: 0959-8049, Apr. 1997.
International Search Report and Written Opinion, for PCT/US2007/012073, Mailed Jul. 23, 2008, 12 pages.
International Preliminary Report on Patentability Issued in PCT/US2007/013049, Mailed Dec. 17, 2008.
International Search Report and Written Opinion issued in PCT/US2007/013049, mailed Jun. 13, 2008.
Office Action issued in U.S. Appl. No. 11/809,792, mailed Aug. 21, 2009, 14 pages.
Oracle Data Hubs: "The Emperor Has No Clothes?", Feb. 21, 2005, Google.com, pp. 1-9.
IEEE, no matched results , Jun. 30, 2009, p. 1.
IEEE No matched Results, 1 Page, Sep. 11, 2009.
Office Action issued in U.S. Appl. No. 11/522,223 dated Aug. 20, 2008, 16 pgs.
Office Action issued in U.S. Appl. No. 11/522,223 dated Feb. 5, 2009, Adams, 17 pages.
Notice of Allowance issued for U.S. Appl. No. 11/522,223, dated Sep. 17, 2009, 20 pages.
De Rose, et al. "Building Structured Web Community Portals: A Top-Down, Compositional, and Incremental Approach", VDLB, ACM, pp. 399-410, Sep. 2007.
Microsoft Dictionary, "normalize", at p. 20, Fifth Edition, Microsoft Corp., downloaded from http://proquest.safaribooksonline.com/0735614954 on Sep. 8, 2008.
Office Action issued in U.S. Appl. No. 11/521,928 dated Apr. 1, 2009, 22 pages.
Office Action issued in U.S. Appl. No. 11/521,928 dated Sep. 16, 2008, 14 pages.
Notice of Allowance issued for U.S. Appl. No. 11/521,928, dated Sep. 18, 2009, 20 pages.
Gopalan Suresh Raj, Modeling Using Session and Entity Beans, Dec. 1998, Web Comucopia, pp. 1-15.
Scott W. Ambler, Overcoming Data Design Challenges, Aug. 2001, p. 1-3.
XML, JAVA, and the future of the Web, Bosak, J., Sun Microsystems, Mar. 10, 1997, pp. 1-9.
Hamming Distance, HTML. Wikipedia.org, Available: http://en.wikipedia.org/wiki/Hamming_distance (as of May 8, 2008).
Office Action Issued in U.S. Appl. No. 11/521,946 mailed May 14, 2008, 10 pgs.
Office Action issued in U.S. Appl. No. 11/521,946 mailed Dec. 9, 2008, 10 pgs.
Office Action issued in U.S. Appl. No. 11/521,946 mailed May 13, 2009, 12 pgs.
Freund et al., Statistical Methods, 1993, Academic Press Inc., United Kingdom Edition, pp. 112-117.
Waddington, D., "Does it signal convergence of operational and analytic MDM?" retrieved from the internet:<URL: http://www.intelligententerprise.com>, 2 pages, Aug. 2006.
International Search Report mailed on Oct. 10, 2008, for PCT Application No. PCT/US07/20311 (10 pp).

International Search Report and Written Opinion issued in PCT/US07/89211, mailing date of Jun. 20, 2008.
International Search Report and Written Opinion for PCT/US08/58404, dated Aug. 15, 2008.
International Search Report and Written Opinion mailed on Dec. 3, 2008 for International Patent Application No. PCT/US2008/077985.
Gu, Lifang, et al., "Record Linkage: Current Practice and Future Directions," CSIRO Mathematical and Informational Sciences, 2003, pp. 1-32.
O'Hara-Schettino, et al., "Dynamic Navigation in Multiple View Software Specifications and Designs," Journal of Systems and Software, vol. 41, Issue 2, May 1998, pp. 93-103.
International Search Report and Written Opinion mailed on Oct. 10, 2008 for PCT Application No. PCT/US08/68979.
International Search Report and Written Opinion mailed on Dec. 2, 2008 for PCT/US2008/077970.
C.C. Gotlieb, Oral Interviews with C.C. Gotlieb, Apr. 1992, May 1992, ACM, pp. 1-72.
Google.com, no match results, Jun. 30, 2009, p. 1.
Supplementary European Search Report for EP 07 79 5659 dated May 18, 2010, 5 pages.
European Communication for EP 98928878 (PCT/US9811438) dated Feb. 16, 2006.
European Communication for EP 98928878 (PCT/US9811438) dated Mar. 10, 2008.
European Communication for EP 98928878 (PCT/US9811438) dated Jun. 26, 2006.
Gill, "OX-LINK: The Oxford Medical Record Linkage System", Internet Citation, 1997.
Newcombe et al., "The Use of Names for Linking Personal Records", Journal of the American Statistical Association, vol. 87, Dec. 1, 1992, pp. 335-349.
European Communication for EP 07795659 (PCT/US2007013049) dated May 27, 2010.
Jason Woods, et al., "Baja Identity Hub Configuration Process", Publicly available on Apr. 2, 2009, Version 1.3., 12 pages.
Initiate Systems, Inc. "Refining the Auto-Link Threshold Based Upon Scored Sample", Publicly available on Apr. 2, 2009; memorandum, 18 pages.
Initiate Systems, Inc. "Introduction", "False-Positive Rate (Auto-Link Threshold)", Publicly available on Apr. 2, 2009; memorandum, 3 pages.
Jason Woods, "Workbench 8.0 Bucket Analysis Tools", Publicly available on Apr. 2, 2009, 42 pages.
"Parsing" Publicly available on Oct. 2, 2008, 6 pages.
Initiate, "Business Scenario: Multi-Lingual Algorithm and Hub," Publicly available on Apr. 2, 2009, 2 pages.
Initiate, "Business Scenario: Multi-Lingual & Many-To-Many Entity Solutions", Publicly available on Apr. 2, 2009, 16 pages.
Initiate, "Relationships-MLH", presentation; Publicly available on Sep. 28, 2007, 9 pages.
Initiate, "Multi-Lingual Hub Support via Memtype Expansion", Publicly available on Apr. 2, 2009, 4 pages.
Initiate Systems, Inc. "Multi-Language Hubs", memorandum; Publicly available on Apr. 2, 2009, 2 pages.
Initiate, "Business Scenario: Support for Members in Multiple Entities", Publicly available on Oct. 2, 2008, 2 pages.
Initiate, "Group Entities", Publicly available on Mar. 30, 2007, 20 pages.
Jim Cushman, MIO 0.5: MIO As a Source; Initiate; Publicly available on Oct. 2, 2008, 14 pages.
Initiate, "Provider Registry Functionality", Publicly available on Oct. 2, 2008, 4 pages.
Edward Seabolt, "Requirement Specification Feature #NNNN Multiple Entity Relationship", Version 0.1-Draft; Publicly available on Oct. 2, 2008, 4 pages.
Initiate, "Arriba Training Engine Callouts", presentation; Publicly available on Mar. 30, 2007, 16 pages.
Initiate, "Business Scenario: Callout to Third Party System", Publicly available on Oct. 2, 2008, 4 pages.
John Dorney, "Requirement Specification Feature #NNNN Conditional Governance", Version 1.0-Draft; Publicly available on Oct. 2, 2008, 15 pages.
Initiate, Release Content Specification, Identity Hub Release 6.1, RCS Version 1.0; Publicly available on Sep. 16, 2005, 38 pages.
Initiate, "Initiate Identity Hub™ Manager User Manual", Release 6.1; Publicly available on Sep. 16, 2005, 159 pages.
End User Training CMT; CIO Maintenance Tool (CMT) Training Doc; Publicly available on Sep. 29, 2006, 17 pages.
"Hierarchy Viewer-OGT 3.0t", Publicly available on Sep. 25, 2008, 4 pages.
"Building and Searching the OGT", Publicly available on Sep. 29, 2006, 22 pages.
Sean Stephens, "Requirement Specification B2B Web Client Architecture", Version 0.1-Draft; Publicly available on Sep. 25, 2008, 16 pages.
"As of: OGT 2.0", Publicly available on Sep. 29, 2006, 23 pages.
Initiate, "Java SDK Self-Training Guide", Release 7.0; Publicly available on Mar. 24, 2006, 141 pages.
Initiate, "Memtype Expansion Detailed Design", Publicly available on Apr. 2, 2009, 3 pages.
Adami, Giordano et al., "Clustering Documents in a Web Directory", WIDM '03, New Orleans, LA, Nov. 7-8, 2003, pp. 66-73.
Chen, Hao et al., "Bringing Order to the Web: Automatically Categorizing Search Results", CHI 2000, CHI Letters, vol. 2, Issue 1, Apr. 1-6, 2000, pp. 145-152.
"Implementation Defined Segments-Exhibit A", Publicly available on Mar. 20, 2008, 13 pages.
Initiate, "Implementation Defined Segments-Gap Analysis", Publicly available on Mar. 20, 2008, 2 pages.
"Supporting Hierarchies", Publicly available on Nov. 29, 2007, 6 pages.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
International Preliminary Report on Patentability, PCT/US2008/58404, Mar. 21, 2011, 4 pages.
European Search Report/EP07795659.7, Apr. 15, 2011, 7 pages.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Preliminary Report on Patentability, PCT/US2007/89211, Apr. 30, 2012, 6 pages.
European Search Report/EP07795108.5, May 29, 2012, 6 pages.
Martha E. Fair, et al., "Tutorial on Record Linkage Slides Presentation", Chapter 12, pp. 457-479, Apr. 1997.
Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115, 1995.
Merriam-Webster dictionary defines "member" as "individuals", 2008, 2 pages.
Ohgaya, Ryosuke et al., "Conceptual Fuzzy Sets-, NAFIPS 2002, Jun. 27-29, 2002, pp. 274-279. Based Navigation System for Yahoo!".
Xue, Gui-Rong et al., "Reinforcing Web-Object Categorization Through Interrelationships", Data Mining and Knowledge Discover, vol. 12, Apr. 4, 2006, pp. 229-248.

* cited by examiner

DATA EXCHANGE AMONG DATA SOURCES

RELATED DATA

This application claims priority from U.S. Provisional Patent Application No. 60/920,739, filed on Mar. 29, 2007, entitled "Method and System for Synchronization of Data Among Data Sources," the entirety of which is incorporated herein as if set forth in full.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

TECHNICAL FIELD OF THE DESCRIPTION

Embodiments of the disclosure relate generally to data exchanges and more particularly to systems and methods for joining search results in collaborative data exchanges.

BACKGROUND

Networked computer systems may allow participants of a data exchange network to derive value from data which other participants might possess concerning an entity or subject of common interest. However, certain policies, issues, considerations, etc. often demand that a particular participant not share certain data with other participants. Sometimes, the restricted data concerns all aspects regarding a particular subject. Sometimes, the restriction applies only to certain participants. In other situations, the restriction applies to only certain aspects of the data related to the subject. In some situations, a combination of these types of restrictions and other factors might apply and cause the affected participant to constrain its activities accordingly.

Each of the participants might be associated with a node in a network over which the participants communicate and exchange data. Due to the wide variety of possible participants, any particular participating computer (PC) system might be quite sophisticated with stringent data management policies in place and enforced. Some PC systems might use sophisticated indexing techniques, document management applications, and the like to organize the records therein. For instance, a particular participant might be an insurance company with a state-of-the-art PC system. Another participant might be a hospital with a PC system without data management controls and few processing resources. Yet another participant might be a physician who uses a rudimentary PC system in or associated with the physician's office.

Another factor concerns the number and size of files in the data exchange. Some participants might have only a few records regarding a limited number of subjects. Other participants might have numerous records regarding multitudes of subjects. Any of these records might contain quite a significant amount of data while other records might contain data of little use. Additionally, all or portions of PC systems of some participants might be unavailable from time to time for a number of reasons thereby depriving other participants of data stored therein.

Permutations of the foregoing factors and others complicate attempts to share data among data exchange participants in an efficient and mutually beneficial manner.

BRIEF SUMMARY OF THE DESCRIPTION

Embodiments of the present disclosure provide systems and methods for joining search results in collaborative data exchanges. Various embodiments eliminate, or at least substantially reduce, the shortcomings of prior art systems and methods for joining search results in data exchanges.

Various embodiments provide a Master Data Exchange (MDX) with mechanisms for delivering substantial business value to ecosystems of organizations interested in sharing selected data for mutual benefit. Operational MDXs, constructed in accordance with various embodiments, are available from Initiate Systems, Inc. of Chicago, Ill. Embodiments disclosed herein use a variety of architectures including, but not limited to, centralized, peer-to-peer, peer-to-peer with a common search service, and hybrid architectures. Various embodiments support successful, multi-party data sharing solutions despite many factors which have impeded previously available systems.

Various embodiments provide methods for joining search results in data exchanges. In some embodiments, participants of a MDX maybe characterized as loosely collaborative. In some embodiments, the environment is such that at least one participant is constrained from sharing at least a portion of data regarding a particular subject. The constrained participant is further constrained to be separate from the other participants. Methods according to some embodiments include receiving a set of results from the constrained participant which exclude the data affected by the data sharing constraint. The results from the constrained participant nevertheless contain some data regarding the subject to which the data sharing constraint applies. Methods can also include receiving a set of results from another participant(s). In some embodiments, the results are virtual. These virtual results do not necessarily persist in the entity, device, processor, hub, etc. which processes them. However, they can persist therein if desired. The method of some embodiments also includes determining whether any portions of the results correspond to the same subject. In some embodiments, the method can include joining portions of the results corresponding to the same subject in a hub.

In some embodiments, the results are sent in response to a query made by the hub and common to all of the participants. As part of the method, a user selected confidence level associated with the results can be satisfied. If desired, the confidence level can be adjusted; the query repeated in real-time; and corresponding portions of the new results joined in real-time. False positive and false negative rates associated with the results may be specified. In various embodiments, the joining can be a probabilistic joining. Some embodiments allow for the results to be normalized before it is determined whether any of the results correspond to the same subject (and are joined accordingly).

When a discrepancy appears between the different results, the method can include notifying the participants (including the constrained participant) that the discrepancy exists. The joined results, in various embodiments, may be adjusted to account for the discrepancy. In some embodiments, the participants may request the joined and adjusted results; the joined and adjusted results may be sent to the participants, or a combination thereof may occur.

Various embodiments disclosed herein include computer readable media comprising instructions executable by a machine which when executed cause the machine to join query results in a loosely collaborative data exchange in accordance with methods described herein. In some embodiments, the instructions cause the machine to satisfy a user selected confidence level associated with the results. The instructions can allow the confidence level to be adjusted and some embodiments allow the query to be repeated in real time. The methods of some embodiments may also include normalizing the results before performing a probabilistic joining of the results. False positive and false negative rates may also be specified in methods of some embodiments.

Systems for joining results in a loosely collaborative data exchange are provided in various embodiments. The systems include various participants of which one, or more, are constrained from sharing some data with the other participants. The constrained participant is also constrained to be separate from the other participants. The systems can include a hub in communication with the participants and which includes a processor, a display, and a computer readable memory in communication with each other. The computer readable medium can carry instructions which cause the processor to for join search results in manners similar to those disclosed herein.

As is apparent to those skilled in the art, various embodiments provide numerous advantages. Some embodiments support many, if not all, of the various data exchange architectures disclosed herein including centralized, peer-to-peer, peer-to-peer with common search, and hybrid architectures. Various embodiments provide superior accuracy and completeness of search results as well as the ability to provide meaningful search results despite many factors complicating such endeavors. Some embodiments leverage an understanding of relationships between data to improve the accuracy, completeness, and precision of the returned results. Embodiments can scale from small applications to large, global, (and larger) applications involving millions, billions, or larger numbers of records. Embodiments nonetheless can return search results in less than a second. Various embodiments provide these advantages to a wide range of exchange participants including, but not limited to, health organizations, insurance companies, police departments, law and regulatory enforcement agencies, etc. Nodes in various embodiments can run hub related data exchange methods disclosed herein. In some embodiments, nodes use a portal to act as a proxy for the data exchange.

BRIEF DESCRIPTION OF THE FIGURES
SEVERAL VIEWS OF THE DRAWINGS

A more complete understanding of the disclosure and the advantages thereof may be acquired by referring to the following description, taken in conjunction with the accompanying drawings in which like reference numbers generally indicate like features and wherein.

DETAILED DESCRIPTION

Figure 1:
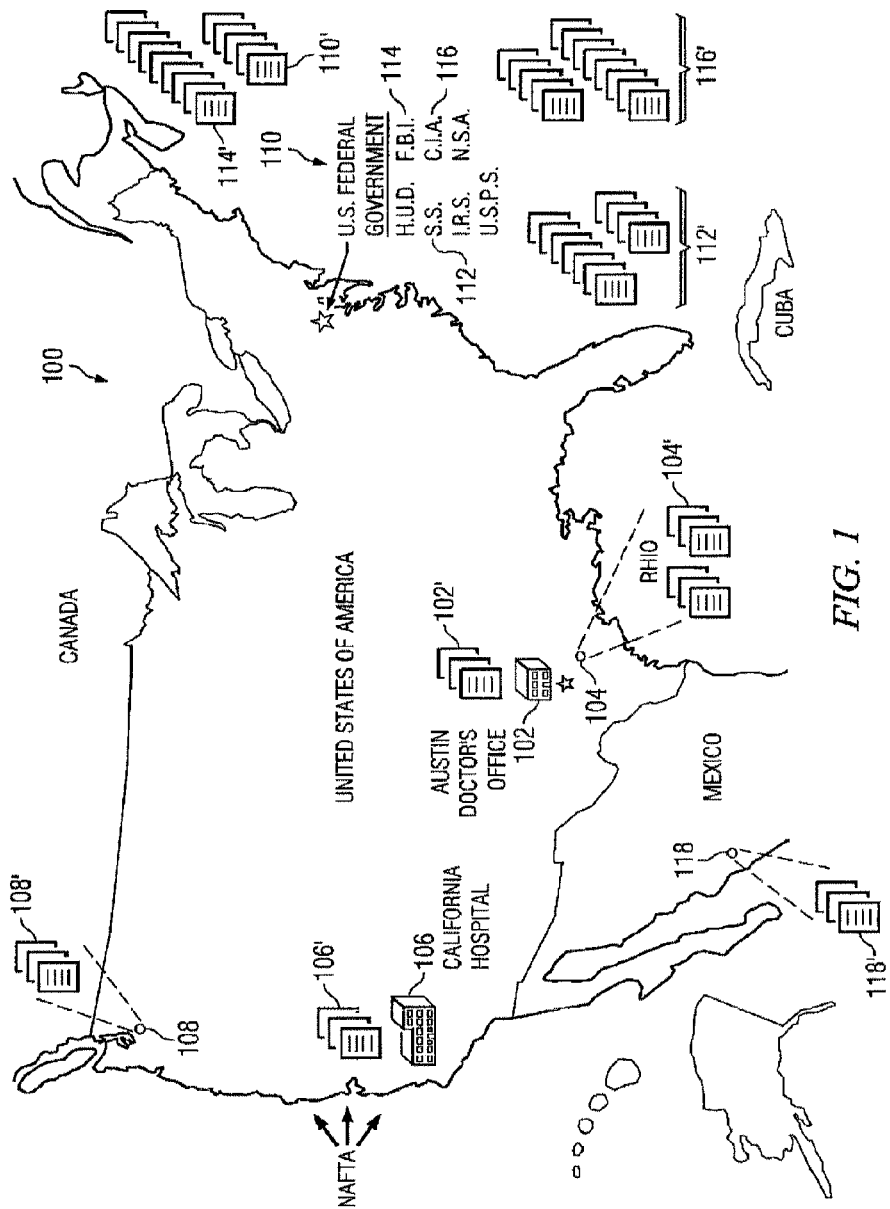
FIG. 1 is a block diagram view of one embodiment of a loosely collaborative data sharing environment.

Preferred embodiments of the disclosure are illustrated in the FIGURES, like numerals being used to refer to like and corresponding parts of the various drawings. Embodiments of the disclosure provide systems and methods for joining results in collaborative data exchanges.

Before discussing specific embodiments, an embodiment of a hardware architecture for implementing certain embodiments is described herein. One embodiment can include a computer communicatively coupled to a network (the Internet in some embodiments). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. In some embodiments, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. In some embodiments, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Data Exchange Environments

Data exchanges allow participants of the exchange to derive mutual benefit by sharing data. Some data exchanges may be limited to a small number of participants. Other data exchanges may be widespread and involve numerous participants physically located across a city, a region, a state, a nation, the entire planet and even, nowadays, participants in space. Value generated from a data exchange tends to increase monotonically as the number of participants in the data exchange increase.

As illustrated in FIG. 1, data exchange environment 100 poses several issues for the design, operation, and maintenance of data exchanges. Environment 100 includes a multiplicity of participants which might include: physician's office 102 in Austin, Tex.; Travis County regional health data organization (RHIO) 104; hospital 106 in California; insurance company 108 in Seattle; Wash.; the United States federal government 110; a sub-division 112 of the U.S. government such as the Social Security Administration; etc. Each of these potential data exchange participants 102, 104, 106, 108, 110, and 112 create, maintain, delete, and otherwise manipulate records regarding various subjects, entities, persons, etc. Each potential participant might have varying degrees of rigor associated with the maintenance of the data contained in their records. Each potential participant 102, 104, 106, 108, 110, and 112 might have computer systems of varying degrees of sophistication and capability. As a result, the quality, consistency, and completeness of data at each disparate participant 102, 104, 106, 108, 110, and 112 is highly likely to vary markedly although this condition need not be the case. As a result of these factors and others sharing data among potential participants 102, 104, 106, 108, 110, and 112 might be problematic.

Certain concerns, policies, laws, etc. constrain potential participants 102, 104, 106, 108, 110, and 112 from sharing certain portions of their records with one and other. For instance, the Health Insurance Portability and Accountability Act (HIPAA) of 1996 places constraints on sharing medical information specific to patients with third parties. In other scenarios, potential participants such as physician 102, RHIO 104, hospital 106, insurance company 108, etc. may share a limited set of data related to their treatment of their patients (or customers or policy holders as the case may be) with each other. Likewise, some potential participants such as U.S. government subdivisions 114 and 116 (as illustrated, here, the FBI and the CIA) might find it imprudent to share data regarding some subjects and entities with other participants such as hospital 106. Potential participants 102, 104, 106, 108, 110, 112, 114, and 116 though can share certain pieces of data about these subjects without running afoul of the concerns associated with the requirement (legal, customary, or otherwise) for treating other data as sensitive, secure, confidential, secret, etc. As a result, each disparate participant 102, 104, 106, 108, 110, 112, 114, and 116 typically implements its own independent, sometimes custom tailored, data security policies, practices, standards, etc. Each disparate participant might also implement its own independent, sometimes custom tailored, data sharing policies, practices, standards, etc. In some cases, some of the disparate participants 102, 104, 106, 108, 110, 112, 114, and 116 might also be forbidden from joining, integrating, linking, etc. data which it owns with the data owned by other participants. Certain participants 102, 104, 106, 108, 110, 112, 114, or 116 can constrain themselves from sharing data with others, obtaining data from others, linking its data with that of others, or a combination thereof.

Each potential participant 102, 104, 106, 108, 110, 112, 114, and 116 though might derive benefit from obtaining data which can be shared (despite the constraints disclosed above) about some subject of interest. For example, if physician 102 concludes that an operation might be required on a given patient who cannot communicate (in some embodiments, because of trauma sustained in an accident) physician 102 might desire to query all other healthcare related participants to determine whether the patient has any conditions, previous operations, concerns, etc. about which physician 102 could benefit from learning. In other embodiments, a participant such as the FBI 114 might want to investigate a particular person who has attracted their attention as a potential terror or crime witness, person of interest, suspect, etc. In such situations, obtaining reported addresses and other data of the subject from other potential participants 102, 104, 106, 108, 110, 112, and 116 and from its own records might be beneficial to FBI 114.

On occasion, participants 102, 104, 106, 108, 110, 112, 114, or 116 appear, dissolve, split, merge, move, or otherwise become modified as a result of various factors. In one embodiment, physician 102 might move, have two or more offices, spin off a laboratory, etc. RHIO 104 might reorganize. Hospital 106 might merge with a larger health care corporation. Insurance company 108 might migrate to a new IT system. Agency 112 might become subject to a new law, treaty, regulation, etc. dictating new or modified data security and sharing policies. FBI 114 and CIA 116 may launch a joint task force to stop a cross border terrorist attack. Keeping track of these changes to environment 100 of FIG. 1 requires some degree of effort, resources, etc. Attempting to do so at each participant 102, 104, 106, 108, 110, 112, 114, and 116 requires additional effort, resources, etc. and introduces another level of complication to the task of consistently finding complete data of high quality.

Performance issues arise when attempts are made in environment 100 to share data. Each participant 102, 104, 106, 108, 110, 112, 114, and 116 can own a data farm (typically in the form of one or more records 102', 104', 106', 108', 110', 112', 114', and 116') which tends to increase in size and complexity while the data exchange(s) which the farm is in may also be increasing in size and complexity. Data exchanges can be configured to operate across portions of the data farms 102', 104', 106', 108', 110', 112', 114', and 116' or across the entire assembly of data farms 102', 104', 106', 108', 110', 112', 114', and 116'. In some data exchanges, potentially billions of records (or more) might be involved.

Data retrieval volumes may be relatively small as when records of interest from a few participants such as physician 102 and hospital 106 are involved in an exchange related to a particular patient. Applications exist, however, which involve ascertaining which particular records, from among a multitude of records 102', 104', 106', 108', 110', 112', 114', and 116' are of interest. In some data exchanges, many requests for data may be occurring simultaneously, placing potentially conflicting demands on the processing and throughput resources associated with the data exchange and participants 102, 104, 106, 108, 110, 112, 114, and 116. In some data exchanges involving law enforcement activities, agents across a country(s) might need to access data many times during their daily activities. In some situations, these needs can arise, potentially, each time an inquiry, investigation, arrest, warrant, or summons is made. Large request volumes can therefore arise in many situations.

When a particular participant 102, 104, 106, 108, 110, 112, 114, and 116 wishes to obtain data from another participant, the participant desiring additional data may request that each of the other participants search their respective records 102', 104', 106', 108', 110', 112', 114', and 116' based on search criteria selected by the requesting participant. Each participant, including the requesting participant, can search their respective records for data with attributes matching the search criteria. Results of the searches may then be returned to the requesting participant. Since each participant 102, 104, 106, 108, 110, 112, 114, and 116 conduct their own search, in this scenario, it can be expected (even if each participant searched the exact same data) that the results might vary between participants. One reason, among many, that the results might vary between participants is that each participant 102, 104, 106, 108, 110, 112, 114, and 116 might use a different search algorithm. Another reason that the results might differ between even identical search requests is that PC systems of some participants might be unavailable during one search and available during the next, identical search. In one scenario, an unavailable participant might have conclusive evidence of the existence of the search subject. The requesting participant, though, would receive no, or a null response. In the current scenario, the requesting participant might therefore miss a match or come to believe that it has identified a new or redundant unmatched subject.

In some scenarios, some search algorithms may produce returns with better "false positive" rates, better "false negative" rates, or a combination thereof than other search algorithms. A false positive can occur when a search algorithm identifies a record, which fails to match the search criteria, as matching the search criteria. Many previously available algorithms return the incorrect, false positive result to the search requester thereby degrading the accuracy of the search results. A false negative can occur when a system fails to identify a record as matching the criteria when the record does match the search criteria. Many previously available algorithms fail to return the incorrect, false negative to the search requestor thereby degrading the accuracy and completeness of the search results.

A scenario can illustrate the concept of a false positive. Suppose that a father and son have the same name, same address, and same telephone number. They are obviously not the same person. Yet, a search request relating to the father might also erroneously return some records for the son. If the age of the target subject had been included in the original search request then it would be possible to determine which records were associated with the father and which were associated with the son. In this scenario, any records that are associated with the son and which are returned in error are false positives. In this scenario, some searching algorithms might identify the son's records as matching the search criteria, as well they might. In fact, they do not match the intent of the search which is to locate records associated with the father. In the foregoing scenario, the search criteria were not specific enough and resulted in an overly broad search.

Another scenario can illustrate the concept of a false negative which can be more problematic in a data exchange than a false positive. Suppose that a search request is made for a woman for whom records that relate to a time before she was married exist in a particular system. A search using her married name as the search criteria might result in records associated with her maiden name being discarded, despite the fact that they relate to the subject of the search. In this scenario, the search results are incomplete. A system generating false results will often return the false positive but often will eliminate the false negative from the search results (or fail to include the false negative in the search results in the first place). By its presence in the search results, a false positive allows its detection. But the absence of a false negative prevents the recipient of the search results from knowing that the search results are incomplete. The recipient of the search results therefore has no way to know that a false negative occurred much less any manner to correct it.

In another scenario, hospital 106 might be investigating a potential patient, the patient's medical history, and more particularly, the possibility that the patient might have had previous operations. The patient might be 20 years old and be called Mr. Jackson of a particular fixed address. It is possible that hospital 106 might retrieve some records in which the name and address match the search criteria but some of these particular operations might have been carried out more than 20 years ago. Medical records older than the person to whom they refer probably indicate that a discrepancy exists in the records or the matching of those records to the patient. These records therefore represent false positives and can be discarded. When a search of a node does not return records because it has incorrectly determined that no match exists, the requestor, here hospital 106, is ignorant of the presence of the false negative. In such situations, the requestor cannot judge the relevance of the missing data. False negatives can introduce inaccuracy into the quality of search results.

The rate at which false positives and the rate at which false negatives occur are likely to vary across the sets of returned search results. One reason that the rates will likely vary is that participants 102, 104, 106, 108, 110, 112, 114, and 116 might use different search algorithms (as disclosed previously). These rates might also vary between different searches since the search algorithms might perform differently with respect to different search criteria. Depending on the particular data being searched, false positive and false negative rates might vary because a particular algorithm might respond differently to data in one area of data being searched (and which can be characterized in some particular manner such as being textual data) and another area of data being searched (and which can be characterized in some other particular manner such as being numeric data).

As mentioned previously, environment 100 can include a variety of potential data exchange participants including, but not limited to, participants 102, 104, 106, 108, 110, 112, 114, and 116. Some participants 104, 106, 108, 110, 112, 114, and 116 may have sophisticated PC systems capable of running data exchange software as disclosed herein while other participants 102 may only have rudimentary PC systems with limited resources for data storage, throughput, processing, etc. Some participants may not have a PC system. In which case a web enabled device, or other device capable of interacting with a data exchange over a network, can provide an interface to a data exchange.

FIG. 1 illustrates that data exchange environments 100 may cross national boundaries. In one embodiment, many participants 102, 104, 106, 108, 110, 112, 114, and 116 exist within one nation while other participants 118 exist in another nation. Environment 100 therefore includes aspects of international, global, etc. interaction. One aspect of environment 100 can be that foreign language participants 118 can exist within environment 100 and can have a desire to participate in data exchanges of environment 100. Often, participants 102, 104, 106, 108, 110, 112, 114, and 116 of one language may have a desire to have participants 118 of some other language participate in data exchanges of environment 100.

Data exchanges often operate in environments 100 in which two types of data, among others, can be encountered during exchanges of data. The first type of data, sometimes referred to as payload data, can be the substantive contents of a record 102', 104', 106', 108', 110', 112', 114', 116' and 118'. As such, payload data can be subject to data security and sharing constraints of differing degrees of stringency. Sometimes, though, payload data can be shared. The ownership and responsibility for payload data is usually retained by the original data owner. In some embodiments, payload data can include details regarding a patient's visit to hospital 106 together with the results of any medical tests carried out on that occasion; details regarding an arrest of a suspect; details related to a persons payment to an account or withdrawals therefrom; etc.

A second type of data that can be encountered in environment 100 involves data required to carry out matching and scoring in order to ascertain whether the record 102', 104', 106', 108', 110', 112', 114', 116' or 118' with which it is associated matches the criteria of a search. Sometimes, the second type of data is referred to as matching data. Matching data can correspond to the data on the front of a folder, while payload data corresponds to the data inside the folder. In many instances, matching data can be shared with other participants 102, 104, 106, 108, 110, 112, 114, 116, and 118 in environment 100 despite data sharing and security constraints associated with the payload data in the underlying record 102', 104', 106', 108', 110', 112', 114', 116', or 118'.

Matching data associated with records 102', 104', 106', 108', 110', 112', 114', 116', or 118' allows search algorithms to quickly and efficiently match records to search criteria without having to parse the payload data of records 102', 104', 106', 108', 110', 112', 114', 116', or 118'. The payload data contained in records 102', 104', 106', 108', 110', 112', 114', 116', or 118' can be held back from the search algorithms thereby protecting potentially sensitive data from inadvertent disclosure, compromise, etc. After the search algorithm determines that a record 102', 104', 106', 108', 110', 112', 114', 116', or 118' matches the search criteria, a decision can be made regarding sharing the corresponding payload data.

Data Exchange Architectures of Various Embodiments

Having discussed some aspects of environment 100 (of FIG. 1) in which data exchanges can operate, various embodiments will be disclosed with reference to FIGS. 2-21. Embodiments illustrated by FIGS. 2-5 provide data exchanges with various architectures including (but not limited to) centralized data exchange 200 (illustrated by FIG. 2), peer-to-peer data exchange 300 (illustrated by FIG. 3), peer-to-peer data exchange 400 with common search features (illustrated by FIG. 4), and hybrid data exchange 500 (illustrated by FIG. 5).

Centralized Data Exchange Architectures

Figure 2:
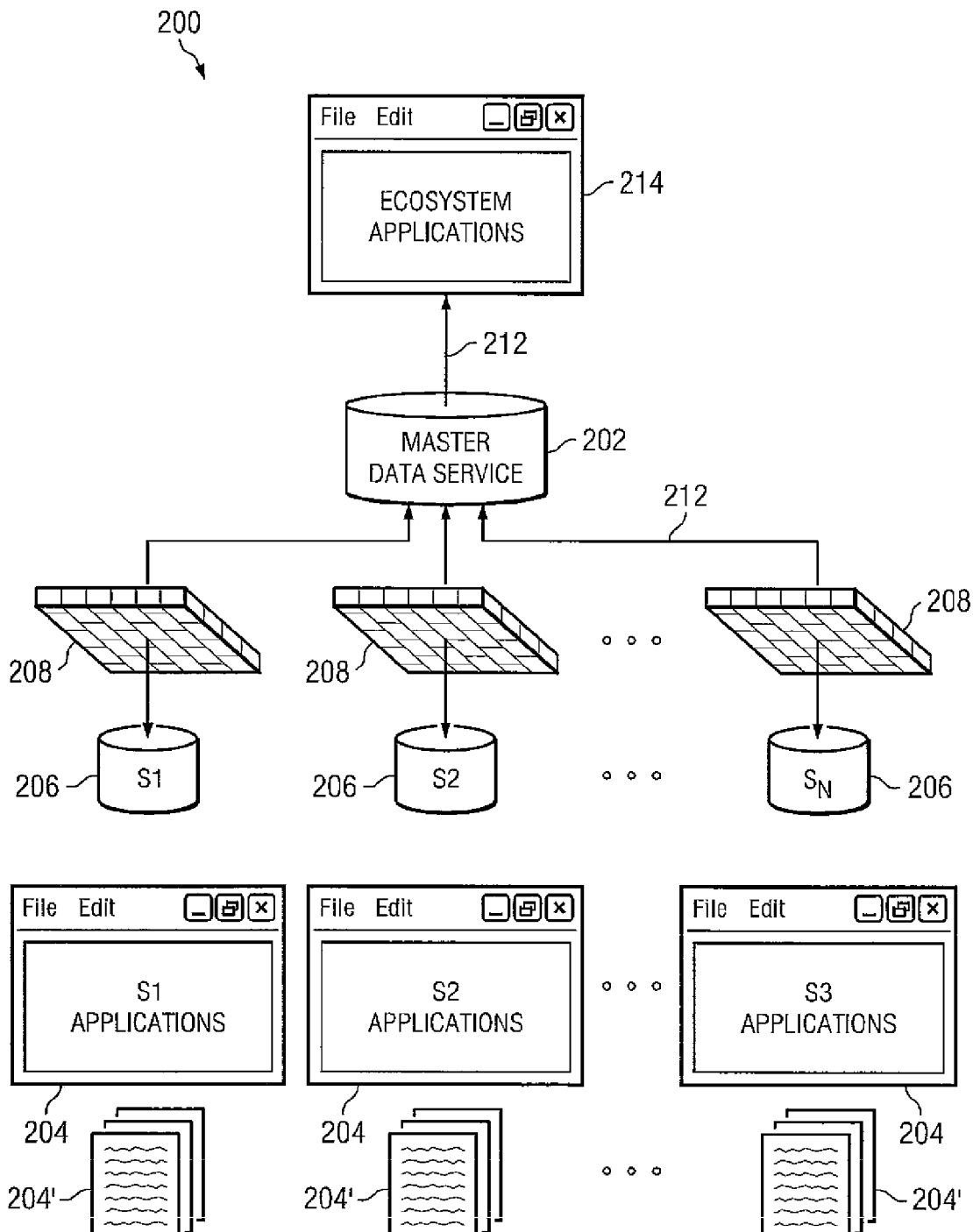
FIG. 2 is a block diagram of one embodiment of a centralized, loosely collaborative, data exchange.

FIG. 2 illustrates one embodiment of centralized data exchange 200 which can include centralized search hub 202 and various participating nodes 204. In some embodiments, search hub 202 is a RHIO and nodes 204 are physician offices, hospitals, insurance companies, etc. Participants 204 can include data storage devices 206 containing records 204' protected from unauthorized access by a firewall 208 (among other possible security mechanisms). Data exchange 200 can include participant 214 who may request that searches of data exchange 200 be performed for records 204' of interest. Search hub 202 and participants 204 and 214 may communicate with data exchange 200, and each other, via network 212. Participants 204 can also request that data exchange 200 perform searches for records 204' of interest from other participants 204 and 214. Data exchange 200 can be used in situations in which participants 204 and 214 can trust each other and search hub 202 with payload data stored in their respective storage devices 206. In some embodiments, search hub 202 can be scaled to serve many hundreds of nodes and record collections of small, moderate, or large size.

Participants 204 can push data which they own, and wish to share, from storage devices 206 to search hub 202. Such data may be in the form of records 204' including payload data and matching data. Participants 204 wishing to search data exchange 200 can send search hub 202 search criteria. Search hub 202 can score the matching data associated with records 204' against the search criteria, obtain relevant records 204' from memory or participants 204, and return relevant records 204' to requesting participant 214. In embodiments in which only matching data is pushed to search hub 202, search hub 202 can request specific relevant records 204' from participants 204. In some embodiments, a "GET" request can be sent to participants 204. Some embodiments can reduce processing overhead at search hub 202 and participants 204 as well as network latency associated with sending search requests to participants 204.

Search hub 202 of various embodiments can provide a single logical point of control where data can be maintained; search algorithm(s) can be executed; or a combination thereof, in a consistent fashion across various participants 204, their records, 204' search requests, and requesting participants 214. In some embodiments, when participants 204 create or modify records 204', data owning participant 204 can send the new or modified records 204' to search hub 202 where subsequent scoring and matching can be performed.

To illustrate a manner in which data exchange 200 can operate, suppose that requestor 214 requests a search for all records 204' related to a "Harry Potter" whose address is 123 Mulberry Lane. In the absence of search hub 202, each participant 204 might make determinations regarding whether their respective records 204' match the search criteria. Some participants 204 might tend to be conservative in their search strategy, not returning a particular record 204' for a "Mr. Harold Potter" or a "Harry Potter on 123 Mulberry Pl, Apartment A1." Others participants 204 might tend to be liberal in their search strategy, returning records for "Mr. H. Potters," "H. Potters," anyone named "Potter" living at any apartment at 123 Mulberry Lane, Place, Drive, etc. In such embodiments, common search results scoring algorithms can be employed by participants 204 so that given similar data, participants 204 return similar results.

Because search hub 202, or a backup search hub can always be accessible via network 212, data exchange 200 provides search results with little or no latency even when certain participants might be inaccessible. Centralized search hub 202 can provide a place for all data (matching data, payload data, or a continuation thereof) to be pushed by participants 204 whether some participants are requesting searches or not so that, in some examples, centralized search hub 202 can index records 204'. Search requests can be serviced entirely by search hub 202 in some embodiments. A common search algorithm implemented in search hub 202 can guarantee false positive and false negative rates as will be further disclosed herein. Data exchange 200 can be simple to implement logical, and powerful.

Peer-to-Peer Data Exchange Architectures

Figure 3:
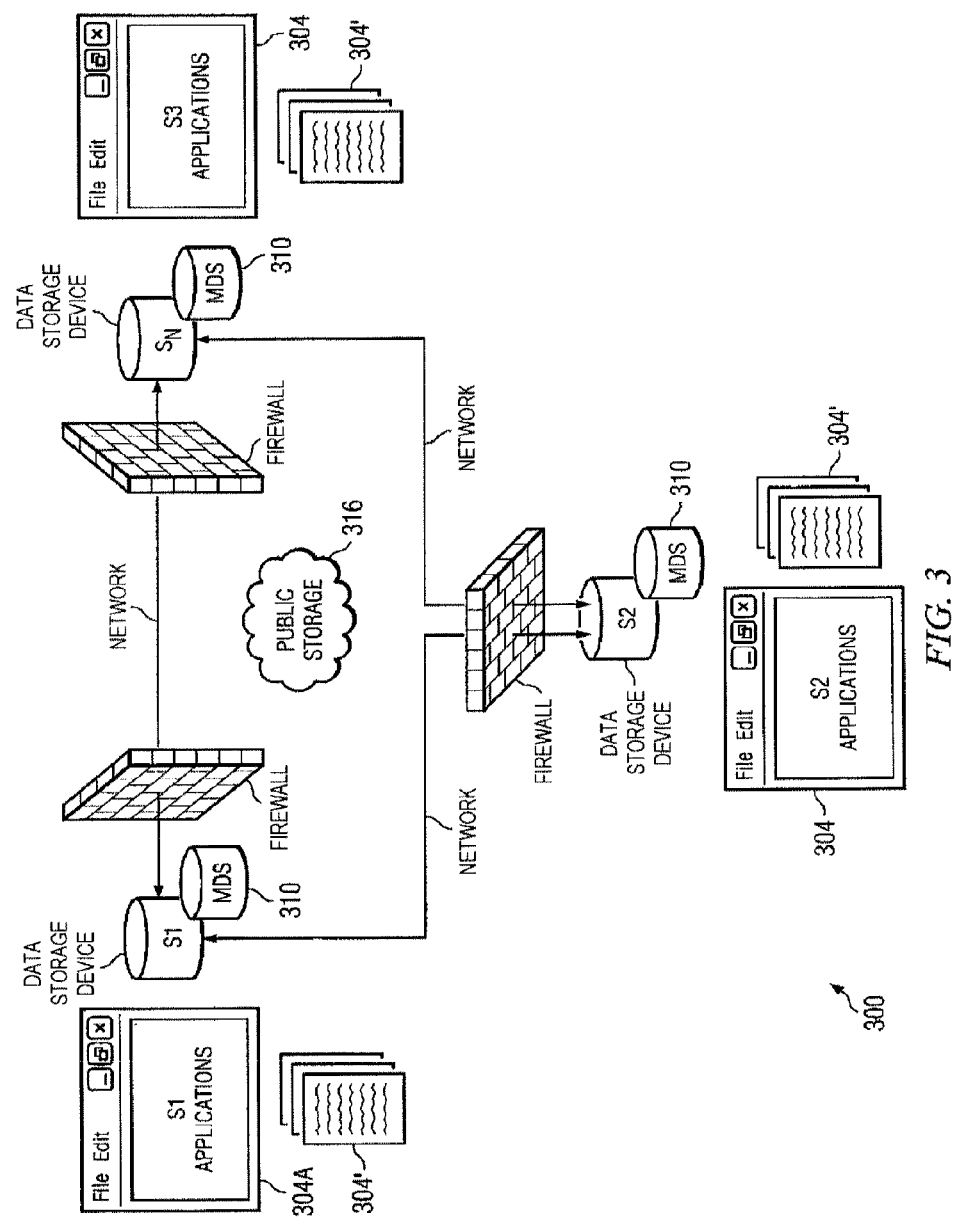
FIG. 3 is a block diagram of one embodiment of a peer-to-peer, loosely collaborative, data exchange.

Various embodiments may implement peer-to-peer data exchanges 300 as illustrated in FIG. 3. Data exchange 300 can include many participants 304. In some embodiments, each participant 304 can include search hubs 310 and can retain and index records 304' which it owns. Data can remain distributed among participants 304 in data exchange 300. In some embodiments, some participants 304 may have data security and sharing policies which constrain them from sharing at least some of the data in their records 304'. Participants 304 can choose how much of their matching data and how much of their payload data to share with other participants 304.

Participants 304 can maintain a list of the other participants in data exchange 304. The list can include participant 304 addresses, communications protocols preferred by various participants 304, and other data to facilitate peer-to-peer communications and data sharing in data exchange 300. Each participant 304 of some embodiments can be configured to communicate with other participants 304. Participants 304 can agree on protocols covering such items as search timeouts, return of partial results, etc. Participants 304 can also agree to implement theses protocols locally.

In some embodiments, participants 304 can include the same search and matching algorithms, engines, routines, etc (although they can have differing algorithms) Having a common search algorithm can allow some embodiments to achieve consistency across search results from various participants 304. In some embodiments, participants 304 of data exchange 300 can conduct pull mode searches. In some embodiments, the requestor may wait for all participants 304 to respond before deeming the search complete. If a participant 304 has no data relevant to the search, it may respond with a message indicating a null search result. Provisions may be made such that when a condition exists which prevents one (or more) participant 304 from responding to a search, the requestor may be informed of, or detect the lack of a response. In such embodiments, the search results may be marked, flagged, highlighted, annotated, etc. to indicate possible incomplete results.

To search data exchange 300, a certain participant 304A can poll other participants 304 (and itself) for matching records 304'. Recipients 304 of the search request can search their matching data for matching records 304' and return the matching records 304' to requester 304A. When the results arrive, requestor 304A can examine the results, match records 304', detect discrepancies therein, adjust the associated records, and join records 304' which pertain to the same subject. Requestor 304 can request payload data from matching records 304' from participants 304 who returned matching records 304'. When participant 304 follows security policies which indicate that payload data can only be returned when specifically requested, participant 304 can return relevant payload data.

In some embodiments, participants 304 can make some data accessible to other participants 304 in a public storage device 316. Public storage device 316 can serve as a repository of data from various participants 304 who may not have adequate PC systems for full participation in data exchange 300. Such participants 300 can push their records 304' (or portions thereof) to public storage device 316 and use public storage device 316 to search data exchange 300. The accessible data can be some, or all, of the matching data associated with participants' records 304'. In such embodiments, participants 304 can index their own data as well as the matching data in public storage device 316. In such embodiments, participants 304 can search data exchange for records 304 of interest by searching their own indexes for matching data which matches the search criteria. Since the matching data can include a pointer to participant 304 which owns the relevant record 304', requestor 304A can request the relevant records 304' from participants 304 holding those records 304'. In these scenarios, searching participants 304 without relevant records 304' can be avoided along with the consumption of participant resources associated with what might otherwise be a fruitless search (with regard to participants without records relevant to the search).

Peer-to-peer data exchange 300 can be used when one, or more, participants 304 may be reluctant to push match data from all of their records 304' to a centralized hub and in other circumstances. Peer-to-peer data exchange 300 can enable participants 304 to protect their records 304' from compromise. In some peer-to-peer data exchanges 300, participants 304 can choose to abstain from pushing data to public storage device 316.

Peer-to-Peer Data Exchange Architectures Including Search Hubs

Figure 4:
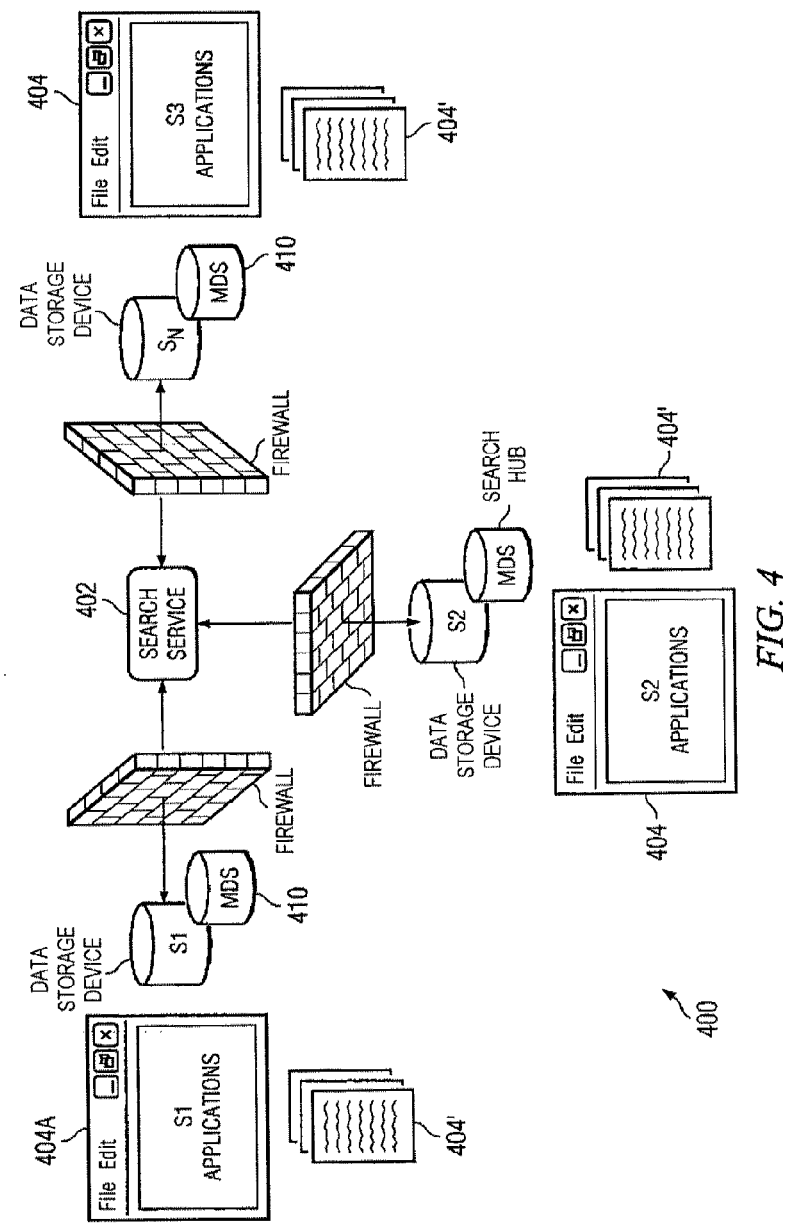
FIG. 4 is a block diagram of one embodiment of a peer-to-peer, loosely collaborative, data exchange with a common search hub.

Various embodiments may implement peer-to-peer data exchanges 400 including centralized search hubs 402 as illustrated by FIG. 4. Search hub 402 can provide a search service common across participants 404. Search hub 402 can serve as a single control point and perform certain functions for participants 404 thereby increasing the level of consistency of search results. Search hub 402 can be configured to communicate with participants 404, to detect whether participants 404 are available or not, and to accept notification of added, removed, or modified participants 404. Search hub 402 can perform a variety of other functions including, but not limited to:

Accepting search requests generated by participants 404.

Re-formulating search requests according to policies enforced at search hub 402.

Distributing the resulting common search requests to participants 404 (including, in some embodiments, the search requester 404A).

Serving as a central control point for implementing and enforcing desired protocols regarding time-outs, partial results, etc.

Receiving search results from participants 404.

Scoring responses to enable the elimination of duplicate records 404' and to enable joining of related records 404'.

Eliminating duplicate records 404'.

Identifying records 404' in the search results which pertain to the same subject.

Detecting discrepancies between records 404' pertaining to the same subject.

Adjusting records 404' with discrepancies accordingly.

Joining records 404' pertaining to the same subject.

Sending search results to search requestor 404A.

Participants 404 can be ignorant of the presence, location, and number of other participants 404. In some embodiments, participants 404 can be configured to generate search requests and send them to search hub 402 for routing to other participants 404 and, if desired, reformulation according to policies implemented in search hub 402. Participants 404 can also be configured to receive search results from search hub 402. In some embodiments, data remains distributed at participants 404 rather than centralized at search hub 402 or elsewhere.

Peer-to-peer data exchange 400 can be easily integrated since participants 404 communicate with search hub 402 rather than with each other. Search hub 402 can serve as a broker between search requestors 404A and participants 404 by, in part, scoring search results from participants 404 and forwarding the search results to requestor 404A. Search hub 402 can enforce consistent scoring and formatting of the returned search results and can guarantee participants 404 user selected confidence levels and false positive rates. In some embodiments, search hub 402 can characterize responses from participants 404 and, for particular participants 404 with search algorithms configured to return results with false negative rates in excess of a user selected threshold, search hub 402 can broaden the search request sent to the particular participant so that, in part, the particular participant returns results as accurate and complete as other participants 404. In some embodiments, peer-to-peer data exchange 400 can include about a hundred participants 404.

Hybrid Data Exchange Architectures

Figure 5:
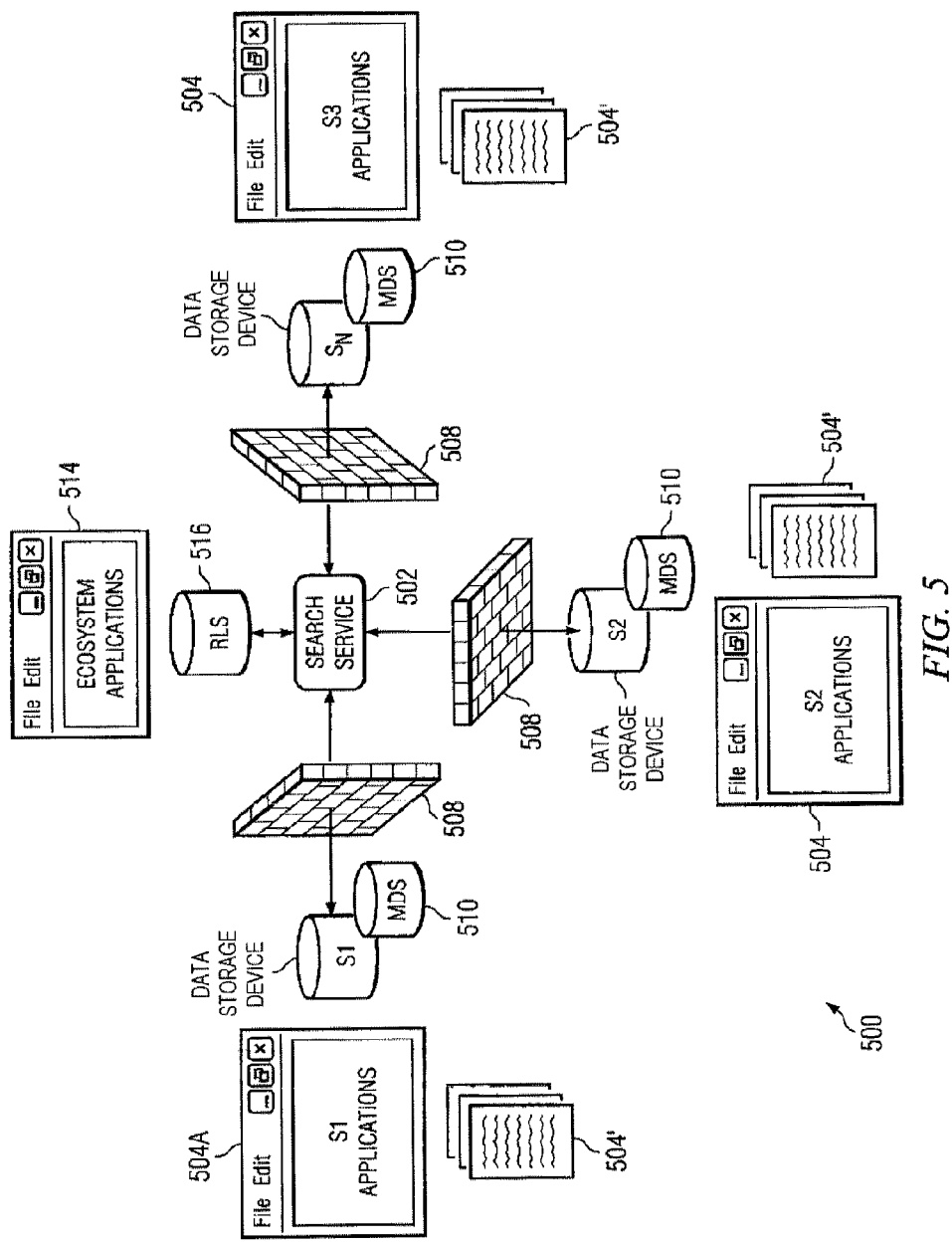
FIG. 5 is a block diagram of one embodiment of a hybrid, loosely collaborative, data exchange which includes features of centralized and peer-to-peer data exchanges.

FIG. 5 illustrates one embodiment of hybrid data exchange 500. Hybrid data exchange 500 includes selected features of centralized data exchange 200 (see FIG. 2) and peer-to-peer data base exchanges 300 and 400 (see FIGS. 3 and 4). Hybrid data exchange 500 can include centralized search hub 502 which can perform many, if not all, of the functions search hub 402 can perform. Search hub 502 can receive matching data regarding records 504' which have been pushed from participants 504 to search hub 502. Search hub 502 can index records 504' using matching data from participants 504. When a search request arrives at search hub 502, search hub 502 can determine (from an index of the matching data) which participants 504 are likely to have records 504' relevant to the search request. In some embodiments, search hub 502 can request that various participants 504 which have records 504' relevant to the search, send the relevant records 504' to hub 502. Participants 504 without relevant records 504' can be left un-polled in some embodiments.

Search hub 502 can provide a single control point for implementing searches, matching results, and scoring results. In various embodiments, search requests may be routed through search hub 502 such that the results of all search requests receive processing using the same matching and scoring algorithm(s). Matching consistency can be enhanced by processing all, or a portion of, search results with the same matching and scoring algorithm(s). In some embodiments, search hub 502 may include exception handling routines such that, when exceptions occur, similar exceptions can be handled in a similar manner. In some embodiments, hybrid data exchange 500 allows optimizing trust, confidentiality, accuracy, and efficiency of searches and the results thereof.

Some embodiments provide a privacy override with which participants 504, subjects, or others can select certain portions of data which they desire be withheld from entities other than participant 504 who owns the data. In one embodiment, a patient care data exchange 500 shares patient details amongst various participants 504. In such an embodiment, a particular patient might request that payload and matching data (or some sub-combination thereof) be kept private from certain participants 504 (or all participants other than the owning participant 504). Privacy requests can be registered with search hub 502, with the participants 504, or a combination thereof. Similar, a patient request to opt out of hybrid data exchange 500 in whole, or part, can be registered with search hub 502, participants, 504, or both. Hybrid data exchange 500 can meet the objective(s) of data security and sharing policies related to confidentiality, data governance, etc. Hybrid data exchanges 500 can be scaled from small applications to large applications while reducing latency and processing demands on participants 504 and other components of data exchange 500.

In some embodiments, hybrid data exchange 500 can include record locator service (RLS) 516. RLS 516 can use matching data (pushed from participants 504) for matching and scoring corresponding records 504' against search criteria. In some embodiments, RLS 516 can include keys to associate the matching data with records 504' which the matching data describes so that relevant records 504' for search requests can be located. Latency associated with search requests can be reduced by data exchange 500 since neither search hub 502 nor RLS 516 have to access participants 504 for matching data. Nor do search hub 502 or RLS 516 have to search participants 504 for relevant records 504'. Rather, search hub 502 and RLS 516 can make specific requests for pre-identified records (with relevant payload data) from participants 504 in real-time. In one scenario, RLS 516 can send a "GET" command to participants 504 to retrieve specifically identified records 504', thereby reducing participant 504 workload relative to data exchanges which search participants 504.

Various embodiments can include masterdata service (MDS) 510. MDS 510 can be a local instantiation of search hub 502 residing at participant 504 behind firewall 508. MDS 510 can encapsulate a reflection of data and databases in search hub 502 and search, matching, etc. algorithms implemented in search hub 502. MDS 510 can serve as a collection point for records 504' in participant 504. In some embodiments, MDS 510 can receive updates of search hub 502 to be reflected in MDS 510. MDS 510 can perform searching, matching, linking, etc. operations for participant 504 and serve as an interface to data exchange 500 associated with participant 504. MDS 510 can also perform searches of participant 504 for other participants 504 in some embodiments.

In some embodiments, the user can select which data exchange 200, 300, 400, or 500 architecture to deploy. During the evolution of a particular data exchange, a user can transition between using the various embodiments described herein. In some embodiments, a user can implement a centralized data exchange 200, migrate to a peer-to-peer data sharing 300, add common search functionality to the peer-to-peer data exchange 400, then migrate to a hybrid data exchange 500.

With reference again to FIGS. 4 and 5, in some embodiments, centralized hubs 402 and 502 can provide common processing of search results. Central hubs 402 and 502 can score results consistently and remove duplicate records in a consistent manner. Even with central hubs 402 and 502 providing consistent processing of return results, the affects of false negatives might still be present in the initial as-received search results. These false negatives can be removed in a consistent fashion by centralized hubs 402 and 502 executing common search algorithms, as disclosed further herein.

Data Exchange Methods of Various Embodiments

Figure 6:
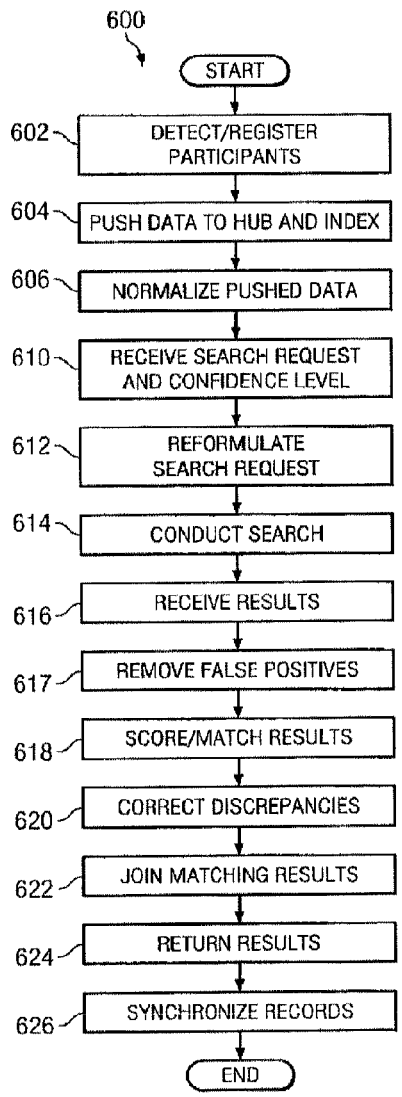
FIG. 6 is a flowchart illustrating one embodiment of a method for sharing data in a loosely collaborative data exchange.
Figure 7:
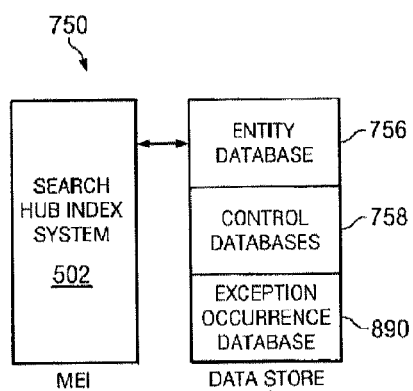
FIG. 7 is block diagram illustrating one embodiment of a search hub.

FIG. 6 (in conjunction with FIG. 5) illustrates one embodiment of method 600 for searching data exchange 500 for records of interest. As illustrated by step 602, search hub 502 can provide a central point of control for registering changes to participants 504 and for implementing changes to data exchange 500 to account for such changes. In some embodiments, participants 504 may contact search hub 502 and register themselves with search hub 502. In some embodiments, when data exchange 500 is initially implemented, search hub 502 can detect participants 504 in communication with data exchange 500 in step 602. As participants 504 join data exchange 500, leave data exchange 500, or are modified in some manner that affects their ability to communicate with data exchange 500 (or that affects the ability to exchange data), search hub 502 can detect and register such changes. The resulting registry can include entrees entries related to the identity, location, and logical address of participants 504 as well as communication and data exchange procedures and protocols associated with participants 504. In some embodiments participants 504 can register a change to a particular participant 504A and configure themselves to account for it.

In step 604, participants 504 can push matching data associated with their respective records 504' to search hub 502. Participants 504 can choose, in accordance with their respective data security and sharing policies, what kinds of data and how much data to push to search hub 502. For some records 504', participants 504 may choose to push no data to search hub 502. For other records 504', participants 504 may choose to push only (a portion of) matching data to search hub 502. For some records 504' participants 504 can push all data associated with the records 504' to search hub 502.

Search hub 502 can be configured to receive the pushed data and associate a key with each record 504', set of matching data, etc. from each participant 504 identifying participant 504 and the pertinent record 504' from which the data originated. When search hub 502 subsequently identifies particular data as matching the criteria of a search request, search hub 502 can use the corresponding key to identify which participant 504 pushed the data of interest to search hub 502 and from which record 504' the data is associated with hub 502. Search hub 502 can send participant 504 having the corresponding records 504' a request for those records 504'. The pushed data may also be indexed in step 604 to facilitate retrieval of the related records 504'.

In some cases, the pushed data may yield varying search responses due to inconsistencies in the pushed data; inconsistencies in what types of data were pushed, inconsistencies in how much data was pushed; etc. between participants 504. Similar inconsistencies can exist at participants 504 and affect search performance and quality if participants 504 are searched, or search themselves. In embodiments without common search algorithms, additional inconsistencies can occur in search responses due to the use of differing search algorithms.

As matching data from participants 504 are pushed to search hub 502, search hub 502 may attempt to match incoming sets of matching data about an entity to a set of matching data already located in search hub 502. In some embodiments, a set of matching data regarding a particular entity might include one attribute field, several attribute fields, or many attribute fields. The set of matching data may be contiguous or be composed of more than one discrete part. The matching process will be described below with reference to FIG. 20. If the incoming set of matching data matches an existing set of matching data, a link between the incoming set of matching data and the existing set of matching data may be generated. If the incoming set of matching data does not match any of the existing sets of matching data in search hub 502, a new entity identifier, as described below, may be generated for the incoming set of matching data. In both cases, the incoming set of matching data may be stored in search hub 502. Then as additional sets of matching data are received from participants 504, these sets of matching data can be matched to existing sets of matching data and the collection of matching data in search hub 502 is increased.

One or more control databases 758 (of FIG. 7) may be used by search hub 502 to control the processing of the matching data to increase accuracy. In some embodiments, one of the control databases may store rules which may be used to override certain anticipated erroneous conclusions that may normally be generated by search hub 502. In some embodiments, the operator of search hub 502 may know, due to past experience, that the name of a particular patient is always misspelled in a certain way and provide a rule to force search hub 502 to associate sets of matching data with the known different spellings. Control databases 758 permit the operator to customize search hub 502 for a particular application or a particular type of data. Thus, for a health care system containing data about a patient, control databases 758 may contain a rule that the nickname "Bill" is the same as the full name "William." Therefore, search hub 502 will determine that matching data otherwise identical except for the first name of "Bill" and "William" contain data about the same entity and should be linked together. Search hub 502 will now be described in more detail.

Figure 8:
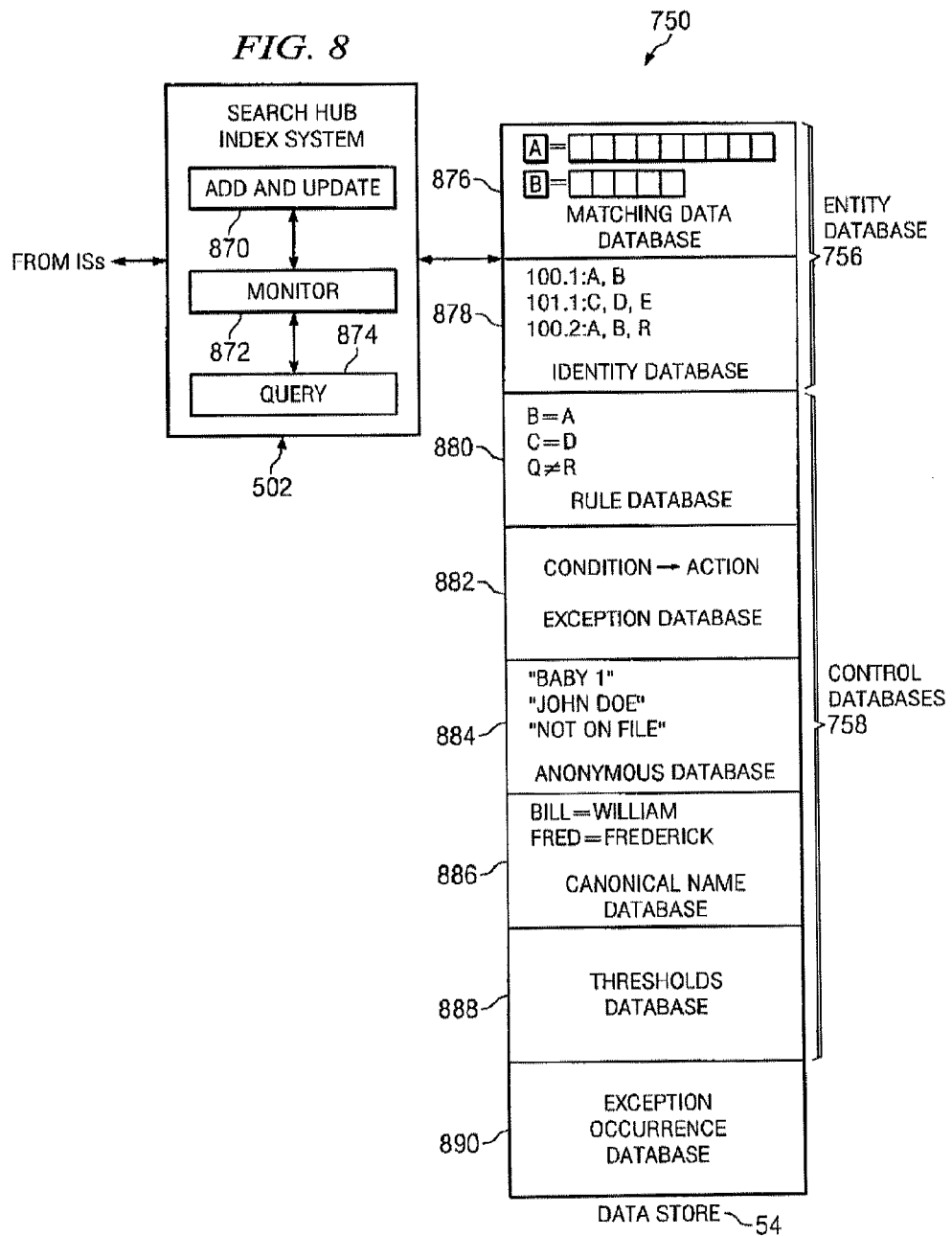
FIG. 8 is a block diagram illustrating one embodiment of a search hub index system.

FIG. 8 is a block diagram illustrating more details of search hub 502 index system 750, and in particular search hub 502 and data store 54. Search hub 502 may include an addition and updating unit 870, monitor unit 872 and query unit 874. Addition and updating unit 870 may add sets of matching data about a new entity into the data store, update data records in the data store, or add new rules to the control databases. Monitor unit 872 may permit a user of search hub 502 index system 750 to view special conditions or exceptions generated by search hub 502. In some embodiments, a set of matching data that requires a person to view the matching data due to an error may be tagged and a message to the operator may be generated. Query unit 874 permits a user of search hub 502 index system 750 to query search hub 502 about data in the matching data or information in the control databases of search hub 502 and search hub 502 will return a response to the query including any relevant matching data and, when permissible, the associated records 504' from participants 504. More details of these units and their associated functions will be described below.

For each of the operations of search hub 502, including the synthesis, as described below, the querying and the monitoring, the results of those operations may depend on a trust value that may be associated with each data field in a set of matching data. The trust computation for a data field may vary depending on the characteristics of the data field, such as the date on which that data containing the field was received, or a quantitative characterization of a level of trust of the information source or particular participant 504. In some embodiments, a data field containing data that was manually entered may have a lower trust value than a data field with data that was transferred directly from another information source. The trust value for a data field may also affect the probability of the matching of data records. Now, data store 54 of search hub 502 index system 750 will be described in more detail.

Search hub 502 may provide other operations that can be constructed from combining the operations listed above. For example, an operation to process a set of matching data for which it is not known if a set of matching data exists can be constructed by combining the query operation for sets of matching data with the add new set of matching data or update existing matching data operations. These "composite" operations may lead to better performance than if the operator executed a combination of the basic operations. They also relieve the operator of having to determine the correct sequencing of operations to achieve desired results.

Data store 54 may include entity database 756, one or more control databases 758, and exception occurrence database 890. Entity database 756 may include matching data database 876 and identity database 878. Matching data database 876 may store the sets of matching data and the addresses of the associated data records 504' in search hub 502 index system 750, as described above, while the associative identity database 878 may store a group of data record identifiers that associate or "link" those sets of matching data which contain data about the same entity. The separation of the logical records 504' and associated sets of matching data from the links between the sets of matching data and logical records 504' permits more flexibility because a duplicate copy of the data contained in the data record 504' is not required to be present in the search hub 502 identity database 878. The data record database 876 and the associative identity database 878 may also be combined if desired.

The identity database 878 represents the combination of sets of matching data in the matching data database 876 that refer to the same entity. Each entity can be assigned an entity identifier. Entity identifiers are based on the concept of "versioned" identification. An entity identifier consists of a base part and a version number. The base part represents a specific individual about whom information is being linked. The version number represents a specific combination of sets of matching data that provides information about the entity that is known at a specific time. In this example, the sets of matching data are shown as squares with the alphabetic identifier of the set of matching data inside, and the entity identifier is shown as the base part followed by a period followed by a version number. For example, "100.0" indicates an entity identifier with 100 as the base part and 1 as the version number. In this example, entity identifier 100.0 links sets of matching data A and B, entity identifier 101.1 links data records C, D and E, and entity identifier 101.2 links sets of matching data A, B, and R. Now, the details of the control databases will be described.

The one or more control databases 758 may permit the operator of search hub 502 index system 750 to customize search hub's 502 processing based on information known to the operator. The control databases shown are merely illustrative and search hub 502 may have additional control databases which further permit control of search hub 502 by the operator. The control databases may, for example, include rules database 880, exception handling database 882, anonymous name database 884, canonical name database 886, and thresholds database 888.

The rules database may contain links that the operator of search hub 502 has determined are certain and should override the logic of the matching of the search hub 502 index system 750. For example, the rules database may contain identity rules (i.e., rules which establish that a link exists between two sets of matching data) and/or non-identity rules (i.e., rules which establish that no link exists between two sets of matching data). In some embodiments, the rules database contains identity rules which are A=B and C=D and a non-identity rule which is Q.notequal.R. These rules force search hub 502 to establish links between sets of matching data or prevent links from being established between sets of matching data. In some embodiments, participants 504 may have four patients, with sets of matching data S, T, U, and V respectively, who are all named George Smith and the operator may enter the following nonidentity rules (i.e., S.notequal.T, T.notequal.U, U.notequal.V, V.notequal.S) to keep the matching data of the four different entities separate and unlinked by search hub 502. The rules in the rules database may be updated, added, or deleted by the operator of the search hub 502 index system 750 as needed.

Exception handling database 882 contains one or more exception handling routines that permit search hub 502 index system 750 to handle matching data problems. The exception handling rules within the database may have the form of "condition.forwardarrow.action" processing rules. The actions of these rules may be actions that search hub 502 should automatically take in response to a condition, in some embodiments, to request that an individual manually review a set of matching data. An example of an exception handling rule may be, "if duplicate data record.fwdarrow.delete set of matching data" which instructs search hub 502 to delete a duplicate set of matching data. In some embodiments, "if different attributes (sex).forwardarrrow.request further review of set of matching data" which instructs search hub 502 that if there are two sets of matching data that appear to relate to the same entity, but the sex of the entity is different for each set of matching data, search hub 502 should request further review of the sets of matching data. In response to this request, an operator may determine that the sets of matching data are the same, with an incorrectly typed sex for one of the sets of matching data and the operator may enter a rule into the rules database that the two sets of matching data are linked together despite the difference in the sex attribute. The exception database may have an associated database 880 (described below) which stores the actual exceptions that occur during processing of the input sets of matching data in step 604 of FIG. 6.

The anonymous name database 884 permits search hub 502 to automatically recognize names that should be ignored for purposes of attempting to match two sets of matching data. In this example, the anonymous name database may contain "not on file", "John Doe" and "baby.subtext.-1" which are names that may be typically assigned by a hospital to a patient when the hospital has not yet determined the name of the patient. As another example, a part not in a warehouse inventory may be referred to as "not on file" until the part may be entered into the database. These anonymous names may be used by search hub 502 to detect any of the anonymous names or other "filler" data that hold a space, but have no particular meaning in the matching data and ignore those names when any matching is conducted because a plurality of sets of matching data containing the name of "John Doe" should not be linked together simply because they have the same name.

The canonical name database 886 may permit search hub 502 to associate short-cut data, such as a nickname, with the full data represented by the short-cut data, such as a person's proper name. In this example for a health care organization, the nickname Bill may be associated with William and Fred may be associated with Frederick. This database permits search hub 502 to link together two sets of matching data that are identical except that one set of matching data uses the first name Bill while the second set of matching data uses the first name William. Without this canonical name database, search hub 502 may not link these two sets of matching data together and some of the data about that patient will be lost. Thresholds database 888 permits the thresholds used by search hub 502 for matching sets of matching data, as described below, to be adjustable. For example, an operator may set a high threshold so that only exact sets of matching data are matched to each other. A lower threshold may be set so that a set of matching data with fewer matching data fields may be returned to the user in response to a query. The details of the matching method will be described below in more detail.

The exception occurrence database 880 allows search hub 502 index system 750 to maintain a record of all of the exceptions that have occurred. The exception occurrence database may store the actual exception conditions that have arisen during processing. For example, the exception occurrence database may contain an entry that represents that entity 100.2 has two sets of matching data with different values for the "sex" attribute.

The operator of search hub 502 index system 750 may clear the identity database 878 without clearing the matching data database 880. Thus, an operator may have search hub 502 index system 750 receive a plurality of input sets of matching data and generate a plurality of links with a particular matching threshold level, as described below, being used. The operator may then decide to perform a second run through the matching data using a lower matching threshold level to produce more links, but does not want to delete the data records themselves, and does not want to delete the identity and non-identity rules from the rules database created during the first run through the data. Thus, the operator may delete the identity database, but keep the control databases, and in particular the rules database, for the second run through the data. Now, a method of adding or updating data in search hub 502 index system 750 in accordance with various embodiments will be described.

Figure 9:
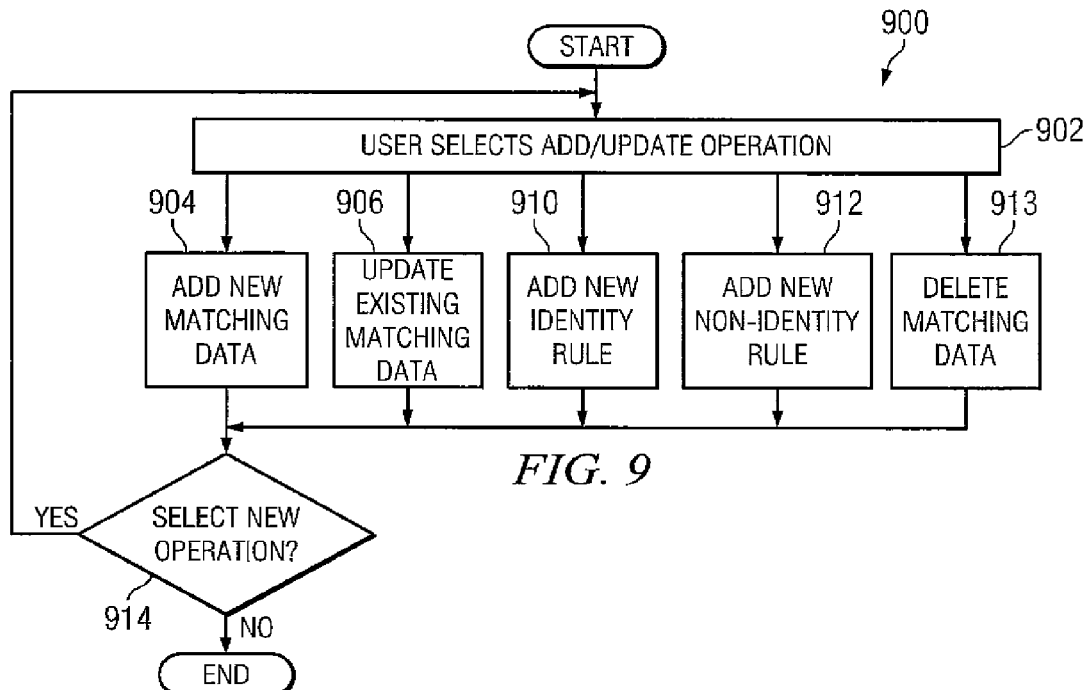
FIG. 9 is a flowchart illustrating one embodiment of a method for adding and updating matching data to a search hub index system.

FIG. 9 is a flowchart illustrating one embodiment of method 900 for adding or updating data within search hub 502 index system 750. The user selects an add/update operation in step 902 which permits the user to select, for example, add new matching data operation 904, update matching data operation 906, add new identity rule 910, add new non-identity rule 912, and delete matching data operation 913. The add new matching data operation permits a user of search hub 502 index system 750 to add a new set of matching data containing data about an entity into search hub 502 index system 750 while the update an existing set of matching data operation permits a user of the system to update the set of matching data or data about an entity that already exists within search hub 502 index system 750. The add identity and add non-identity rule operations permit the user to add identity or nonidentity rules into the rules database 880 shown in FIG. 8. The delete operation permits the user of the search hub 502 index system 750 to delete a set of matching data from the matching data database. Each of these operations will be described in more detail below with reference to FIGS. 11-16. Search hub 502 index system 750 may then determine whether there are additional addition or updating operations to perform in step 914 based on the user's response and either exit the method or return to step 902 so that the user may select another addition or updating operation. The add/update/delete operation may also be used for the control databases to add/update/delete information in those databases, and additional processing may occur due to changes in the control databases which may change the identity database. In all of those cases, the additional processing is to identify the existing sets of matching data that are impacted by the modification, and to use the match/link operation to re-compute the appropriate entries in the identity database. In some embodiments, removing a record for the anonymous name database would cause re-computation of identities of all sets of matching data with that anonymous name, and all sets of matching data linked to those sets of matching data.

For all of the sets of matching data stored by search hub 502 index system 750, a record identifier may be used to uniquely identify the entity referred to by that set of matching data compared to other sets of matching data received from participant 504. For example, in sets of matching data obtained from a hospital information system, an internally-generated patient identifier may be used as a record identifier, while in sets of matching data from a health plan membership database, a social security number can be used as a record identifier. A record identifier differs from an entity identifier because its scope is only the sets of matching data from a single data source. For example, if a person in a health plan is a patient in the hospital, their hospital record will have a different record identifier than their health plan record. Furthermore, if sets of matching data from those two data sources happened to have the same record identifier, this would be no indication that the sets of matching data referred to the same entity.

An additional aspect of the matching data database is that one or more timestamps may be recorded along with the sets of matching data. The timestamps may indicate when the sets of matching data were last changed (e.g., when a set of matching data is valid) and when a set of matching data was received from its data source. The timestamps may be used to track changes in a set of matching data which may indicate problems, such as fraud, to the operator of search hub 502. The timestamps may be generated whenever a set of matching data is added to search hub 502 index system 750 or updated so that the historical changes in the set of matching data may be documented. Additionally, individual attribute values may be associated with status descriptors that describe how the values should be used. For example, an attribute value with an "active" status would be used for identification, an attribute value with an "active/incorrect" status would be used for identification but not presented to the operator as being the correct value (for example, an old address that still occurs in some incoming sets of matching data), and a status of inactive/incorrect means that the value should no longer be used for matching but should be maintained to facilitate manual review. Now, a method for querying search hub 502 index system 750 in accordance with various embodiments will be described.

Figure 10:
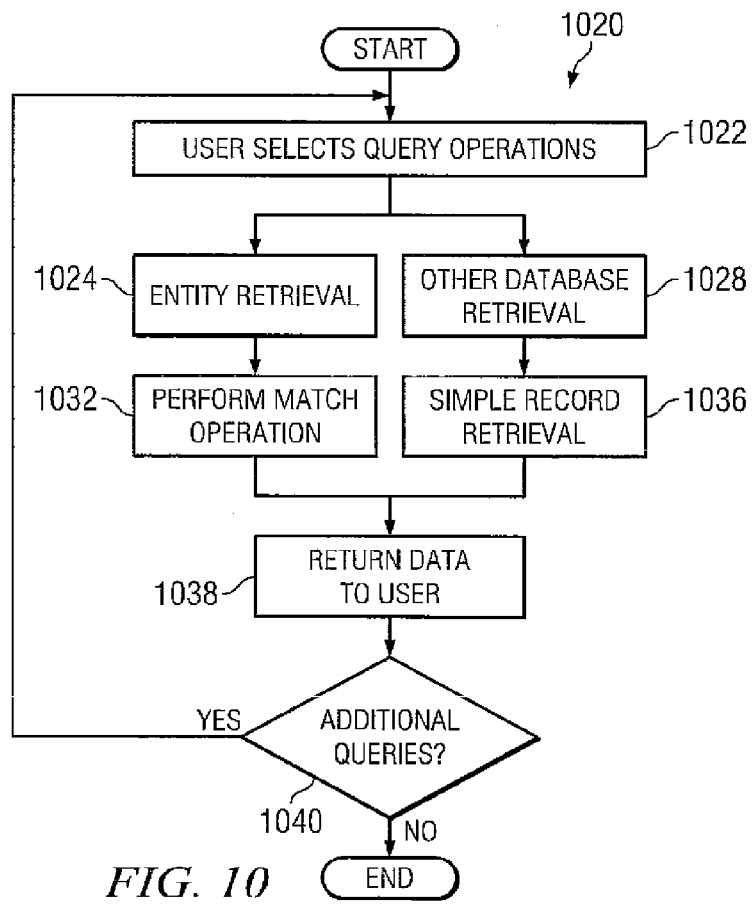
FIG. 10 is a flowchart illustrating one embodiment of a method for querying a search hub index system.

FIG. 10 is a flowchart illustrating one embodiment of method 1020 for querying search hub 502 index system 750 in accordance with various embodiments. The querying operations permit the user to retrieve information from search hub 502 index system 750 about a particular entity or data from one of the control databases. After a user selects the query operation in step 1022, the user may select from a particular query operation that may include an entity retrieval operation 1024, or a database query operation 1028. For the entity retrieval operation, search hub 502 index system 750 in step 1032 may execute the match operation 1660 described below with reference to FIG. 16. During the match operation, an input query may be matched against sets of matching data from various participants 504, as described in more detail below with reference to FIG. 20. For the database retrieval operation, the operator specifies a database and a set of attribute values that indicates the records of interest. Search hub 502 index system 750 in step 1036 may locate sets of matching data corresponding to those records 504' in the specified database that has corresponding values for the specified attributes.

Additional queries may be performed by search hub 502 index system 750. Search hub 502 index system 750 may be queried about the number of entities in search hub 502 index system 750 and search hub 502 index system 750 may respond with the number of entities in the search hub 502 index system 750. Search hub 502 index system 750 may also be queried about the volatility (e.g., the frequency that the data records change) of the data in the sets of matching data using a timestamp indicating the last time and number of times that the data has been changed that may be associated with each set of matching data in search hub 502 index system 750. The volatility of the data may indicate fraud if the data about a particular entity is changing frequently. Search hub 502 index system 750 may also be queried about the past history of changes of the data in the matching data so that, for example, the past addresses for a particular entity may be displayed. Once the queries or matches have been completed, the data is returned to the user in step 1038. Search hub 502 index system 750 may then determine whether there are additional queries to be performed in step 1040 and return to step 1022 if additional queries are going to be conducted. If there are no additional queries, the method ends. Now, an exception processing method that may be executed by search hub 502 index system 750 will be described.

Figure 11:
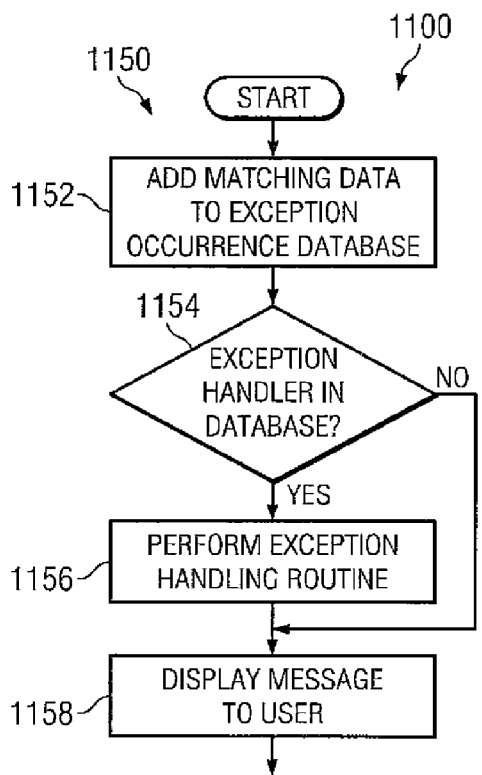
FIG. 11 is a flowchart illustrating one embodiment of a method for processing exceptions which may be executed by a search hub index system.

FIG. 11 is a flowchart of one embodiment of method 1100 for processing exceptions 1150 that may be executed by search hub 502 index system. The input is data describing the occurrence of an exception, for example, an entity whose sets of matching data indicate two different values for the entity's sex. In step 1152, the exception given as input to the operation is recorded in the exception occurrence database. In step 1154, search hub 502 index system 750 determines if there is an exception handling rule within the exception handling database 882 for handling the anomaly, as shown in FIG. 8. As described above, the exception handling database contains a plurality of rules for handling various types of exceptions. If an exception handling rule is in the exception handling database, in step 1156, search hub 502 index system 750 may perform the exception handling routine in the database. The routine may generate a message for the operator or may process the data using another software program. A message may be displayed to the user in step 1158. If there was not an exception handling routine in the exception handling database, then a message is printed for the user in step 1158. The message may require the user to perform some action or may just notify the operator of the action being taken by search hub 502 index system 750 in response to an exception. After the message is displayed, the exception handling method has been completed. Now, the operations that may be performed by search hub 502 index system 750 during the addition and updating data method will be described.

Figure 12:
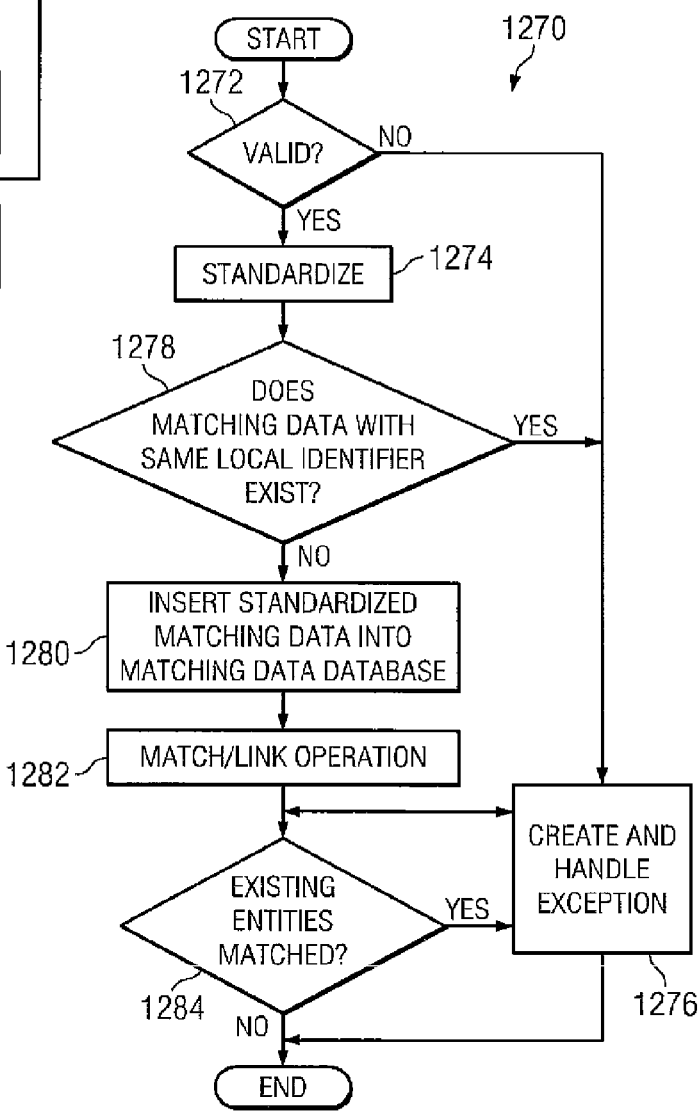
FIG. 12 is a flowchart illustrating one embodiment of a method for inserting new matching data into a search hub index system.

FIG. 12 is a flowchart illustrating one embodiment of method 1270 for inserting a new data record into search hub 502 index system 750 in accordance with various embodiments. The insertion of a new set of matching data for a new entity usually occurs when a particular participant 504 has determined that the new set of matching data should not refer to the same entity as any other set of matching data previously generated by the particular participant 504.

For inserting a new set of matching data into search hub 502 index system 750, a record containing the set of matching data is received by search hub 502 index system 750 from the user. Search hub 502 index system 750 may then attempt to validate and standardize the fields in the new set of matching data.

Validation in step 1272 may include examining the lengths of the fields or the syntax or character format of the fields, for example, as numeric fields may be required to contain digits in specified formats. Validation may also involve validating codes in the new set of matching data, for example, valid state abbreviations or diagnostic codes. Additional data sets may be involved in the validation process, for example, a data set containing valid customer account numbers. If the validation process fails, in step 1276 an exception may be created that indicates that invalid data is received, the exception handling method described above may be performed, and processing of the insert new set of matching data operation is complete.

During standardization in step 1274, search hub 502 index system 750 may process the incoming set of matching data to compute standard representations of certain data items. For example, the incoming set of matching data may contain the first name of "Bill" and search hub 502 index system 750 may add a matching field containing "William" into the incoming set of matching data so that search hub 502 index system 750 may match data records to William. This standardization prevents search hub 502 index system 750 from missing sets of matching data due to, for example, nicknames of people. Other kinds of standardization may involve different coding systems for medical procedures or standard representation of street addresses and other geographic locations.

Search hub 502 index system 750 may then attempt in step 1278 to determine if a set of matching data with the same record identifier already exists in the matching data database. If the standardized input data has the same record identifier as an existing set of matching data, in step 1276 an exception may be created that indicates that a two sets of matching data with the same record identifier have been received, the exception handling method described above may be performed, and processing of the new set of matching data operation is complete. If the standardized input data does not have the same record identifier as an existing set of matching data, then the standardized input data may be added into search hub 502 index system 750 and a timestamp may be added to the set of matching data in step 1280. Then in step 1282, the match/link method 2000 described below and summarized in FIG. 20 may be performed. The match/link operation is initiated using the standardized input data, and its execution makes the results of the match/link operation available to the insert new set of matching data operation. Then in step 1284, search hub 502 index system 750 may determine if the match/link operation linked the standardized input set of matching data with any other sets of matching data from the same participant 504. If so, in step 1276 an exception may be created that indicates that a duplicate set of matching data has been received, the exception handling method described above may be performed, and processing of the inserted new set of matching data operation is complete. If not, the results of the match/link operation are returned to the operator and the insert new set of matching data operation has been completed. Now, a method for updating an existing set of matching data already in search hub 502 index system 750 will be described.

Figure 13:
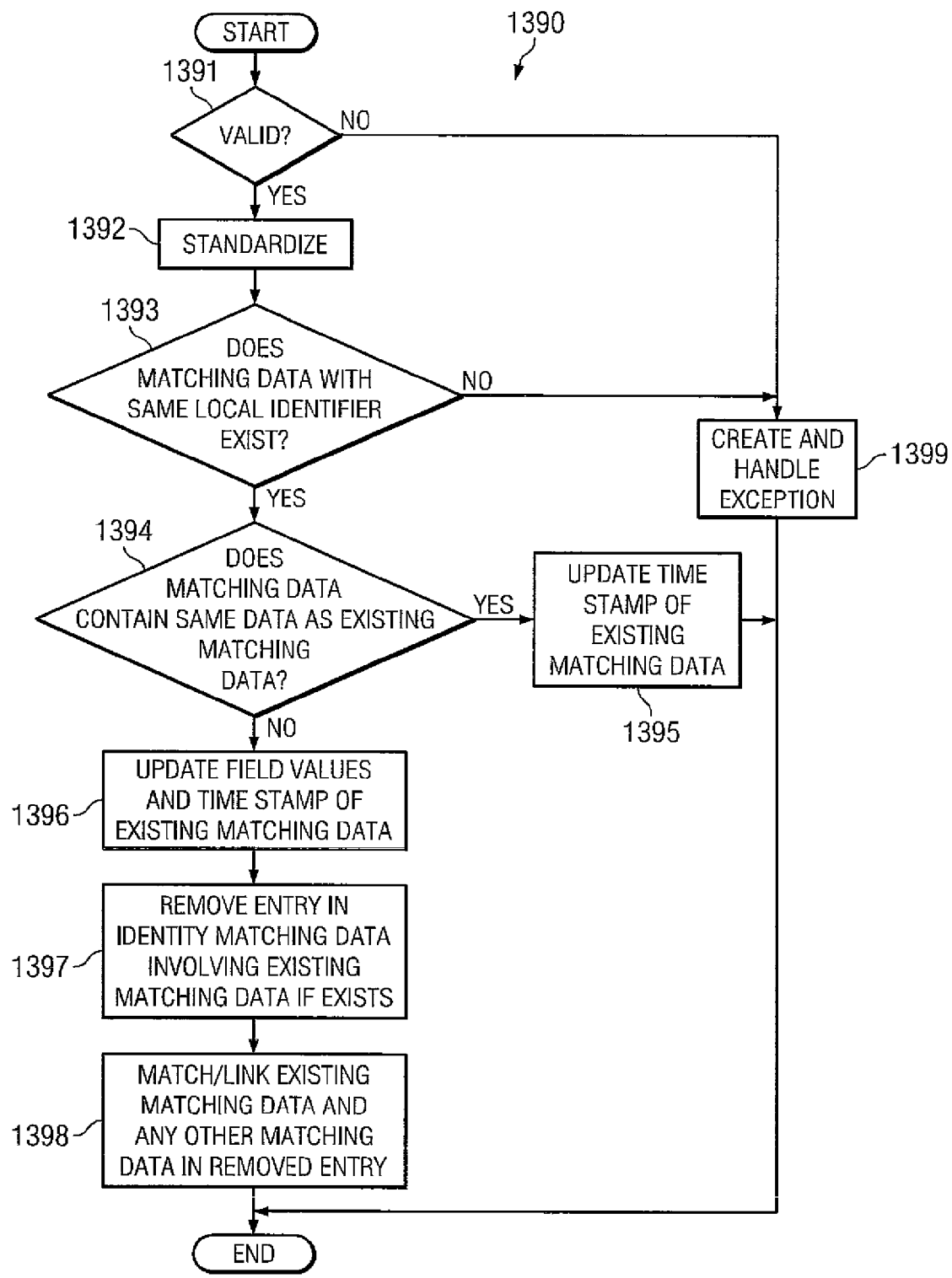
FIG. 13 is a flowchart illustrating one embodiment of a method for updating existing matching data.

FIG. 13 is a flowchart illustrating one embodiment of method 1390 for updating an existing set of matching data containing information about a new or existing entity in accordance with various embodiments. Updates can occur when a participant 504 receives a new set of information concerning an entity for which a set of matching information is already in its data store. The new set of matching data received from participant 504 can be communicated to search hub 502 index system 750 through the update operation.

To perform the update method, search hub 502 index system 750 may first test the input data for validity in step 1391, using the same method as in step 1272 of the add new matching data operation described in FIG. 12. If the validation process fails, in step 1399 an exception may be created that indicates that invalid data is received, the exception handling method described above may be performed, and the processing of the update existing matching data operation is complete. Search hub 502 index system 750 may then standardize the input data in step 1392, using the same method as in step 1274 of the add new matching data operation. Search hub 502 index system 750 may then attempt in step 1393 to determine if a set of matching data with the same record identifier as the standardized input data already exists in the matching data database. If the standardized input data does not have the same record identifier as an existing set of matching data, a new item may be added to the exception database in step 1399 indicating that a duplicate set of matching data was located, and no further processing is performed.

If the standardized input data does have the same record identifier as an existing set of matching data, then the incoming set of matching data is checked in step 1394 to see if it contains exactly the same values for data fields as a set of matching data already contained in the matching data database. If the standardized input data does not have the same record identifier as an existing set of matching data, in step 1399 an exception may be created that indicates that a duplicate set of matching data has been received, the exception handling method described above may be performed, and processing of the update existing matching data operation is complete. If the standardized input data contains exactly the same values, then the execution of this operation cannot affect the identity database. As a result, the timestamp of the existing set of matching data may be updated in step 1395 to reflect the current time and processing of the operation is completed. If the standardized input data contains different field values than the existing set of matching data with the same record identifier, in step 1396 the existing set of matching data's field values may be updated to be consistent with the values in the standardized input data, and its timestamp may be updated to reflect the current time. Since the data in the existing set of matching data has now changed, the impact on the identity database can be computed. To do this, search hub 502 index system 750 in step 1397 may first remove an entry in the identity database involving the existing set of matching data, if such an entry exists. Search hub 502 index system 750 may then perform a match/link operation in step 1398 for the existing sets of matching data and any other sets of matching data referred to in the identity database record removed in step 1397. These are the sets of matching data that had been previously recorded in the identity database as referring to the same entity as the existing set of matching data. The match/link operation performs as described in FIG. 13.

Once the match/link results have been returned in step 1398 or the timestamp updated in step 1395 or an exception has been generated in step 1399, the add new matching data operation has been completed. Now, a method for matching/linking a set of matching data will be described.

Figure 14:
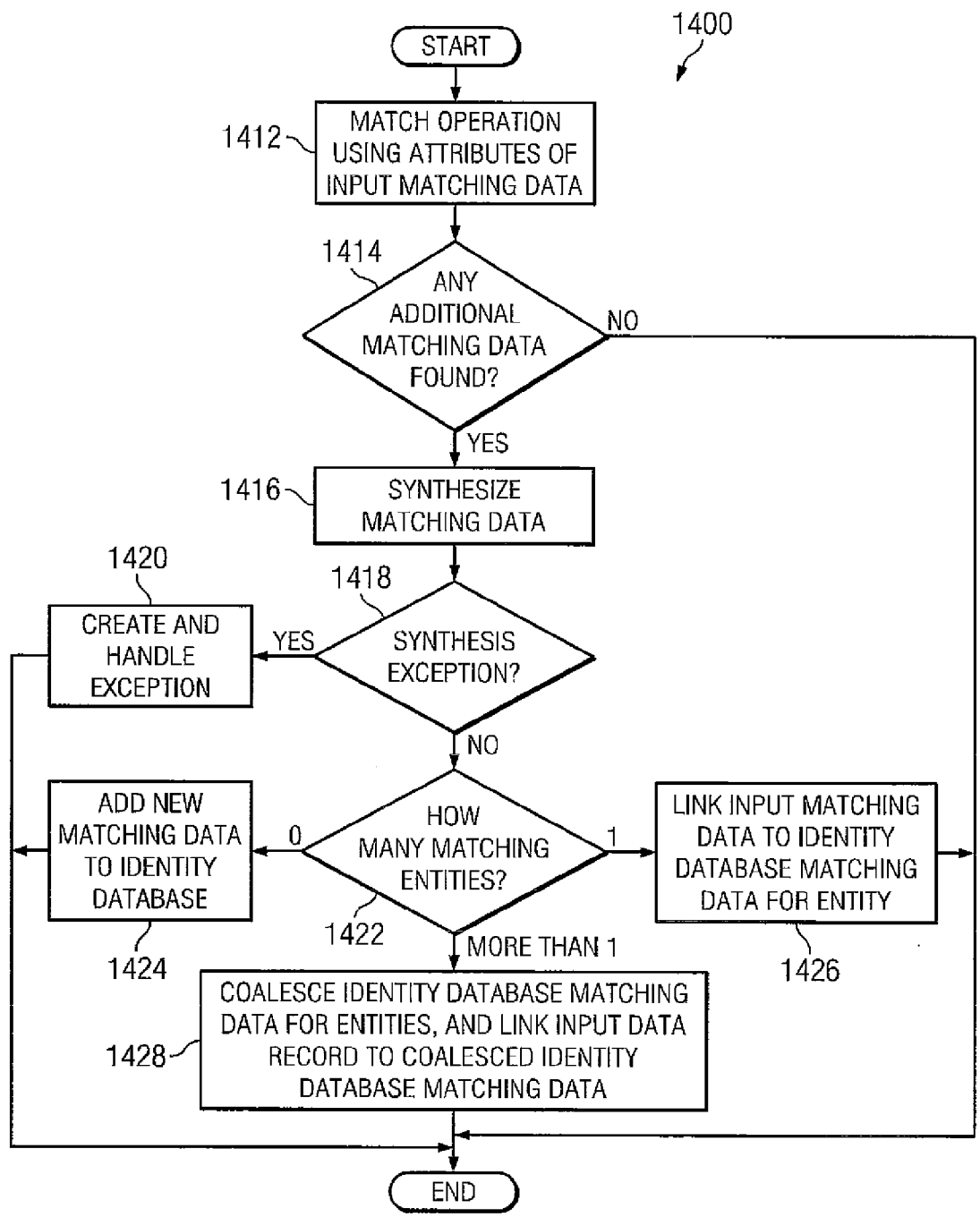
FIG. 14 is a flowchart illustrating one embodiment of a method for matching/linking matching data.

FIG. 14 is a flowchart illustrating one embodiment of method 1400 for matching/linking a set of matching data in accordance with the invention. This operation is used to determine the sets of matching data in the matching data database that refer to the same entity as an input set of matching data in the matching data database.

To perform the match/link operation, in step 1412, search hub 502 index system 750 may perform the match operation 2000 described below and diagrammed in FIG. 20. In this step, the data in the input matching data is given to the match operation as its input, and the sets of matching data returned by the match operation are made available. Search hub 502 index system 750 may then in step 1414 determine if any sets of matching data were made available. If no sets of matching data other than the input matching data were returned, the match/link operation is completed. If at least one other set of matching data was returned, the incoming matching data and matching sets of matching data may be synthesized in step 1416. The synthesis process combines the data values in the set of matching data and the existing sets of matching data associated with the entities. Search hub 502 index system 750 may then in step 1418 determine if a condition indicating a synthesis exception has occurred, as defined by the current contents of the exception database. For example, if the incoming set of matching data lists the sex of the entity as male while one of the matching sets of matching data lists the sex of the entity as female, and the exception database states that coalescing matching data with different sexes is an exceptional condition, an exceptional condition will be identified. If an exception occurs, in step 1420 search hub 502 index system 750 may create and handle the appropriate synthesis exception and the processing of the match/link operation is complete. If there are no synthesis exceptions, then in step 1422, search hub 502 index system 750 may determine the number of identity records currently held in the identity database that link sets of matching data which match the input set of matching data. If no identity records exist, in step 1424, a record may be added to the identity database with a new unique base part and a version number of 0. If exactly one identity record exists, in step 1426 search hub 502 index system 750 may update this record to add a link to the input matching data. If more than one identity record exists, search hub 502 index system 750 in step 1428 may "coalesce" these records—that is, remove the existing identity records and replaces them with a single identity record linking the input matching data with all the sets of matching data returned in step 1412. After one of steps 1424, 1426, and 1428 are performed, the processing of the match/link operation has been completed. Now, a method for adding an identity rule in accordance with the invention will be described.

Figure 15:
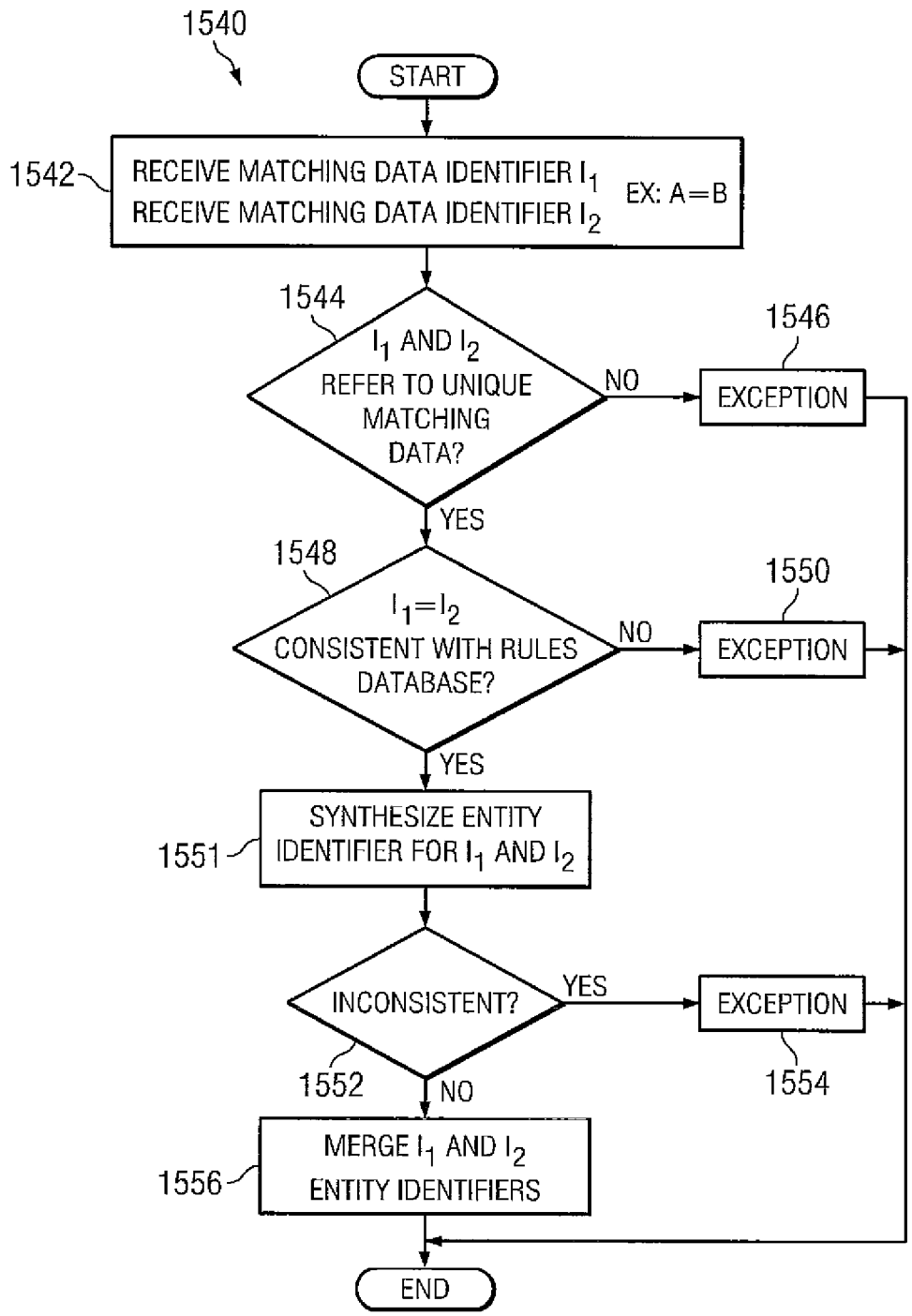
FIG. 15 is a flowchart illustrating one embodiment of a method for adding an identity rule to a search hub index system.

FIG. 15 is a flowchart illustrating one embodiment of method 1540 for adding an identity rule to the rules database of search hub 502 index system 750 in accordance with various embodiments. In step 1542, search hub 502 index system 750 may receive two data record identifiers, I.subtext.1 and I.subtext.2. In this example, the identity rule is I. subtext.1=I.subtext.2 which means that these two sets of matching data contain information about the same entity. Search hub 502 index system 750 may then determine if the two identifiers refer to separate unique sets of matching data in step 1544 and an exception routine may be executed in step 1546 if an exception occurs. If there is no exception, search hub 502 index system 750 determines if the new identity rule is consistent with the rules already contained in the rules database in step 1548. If there is an exception, such as the rules database has a non-identity rule that specifies that I. subtext.1 and I. subtext.2 are not associated with each other, an exception routine is executed at step 1550. If the new identity rule is consistent with the other rules in the rules database, then the entity identifier containing the two sets of matching data are synthesized in step 1551 to determine if there are any inconsistencies within the associations of the two entity identifier as shown in step 1552. If there are any inconsistencies in the entity identifier, an exception handling routine is executed in step 1554. Otherwise, the entity identifier containing the two sets of matching data are merged together in step 1556 and the method is completed. Now, a method of adding a non-identity rule to the rules database in accordance with the invention will be described.

Figure 16:
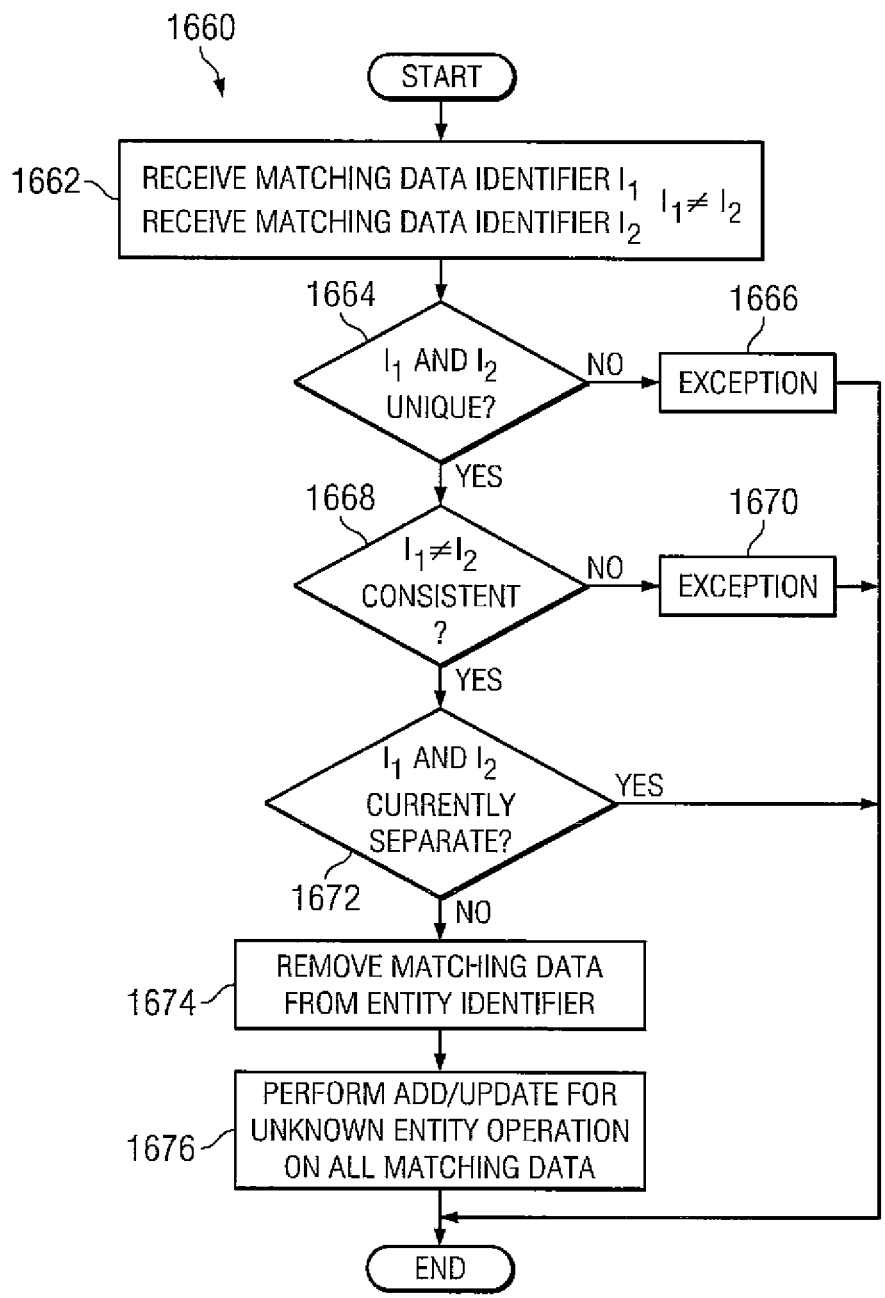
FIG. 16 is a flowchart illustrating one embodiment of a method for adding a non-identity rule to a search hub index system.

FIG. 16 is a flowchart illustrating one embodiment of method 1660 for adding a non-identity rule to the rules database of search hub 502 index system 750 in accordance with various embodiments. In step 1662, search hub 502 index system 750 may receive two data record identifiers, I. subtext.1 and I. subtext.2. In this example, the non-identity rule is I. subtext.1 .notequal.I.sub.2 which means that these two sets of matching data contain information that is not about the same entity. Search hub 502 index system 750 may then determine if the two identifiers refer to separate unique sets of matching data in step 1664 and an exception routine may be executed in step 1666 if an exception occurs. If there is no exception, search hub 502 index system 750 determines if the new non-identity rule is consistent with the rules already contained in the rules database in step 1668. If the new non-identity rule conflicts with one of the existing rules in the rules database, an exception occurs in step 1670. If the new non-identify rule does not conflict, then search hub 502 index system 750 determines whether the two sets of matching data corresponding to the identifiers are currently located in different entity identifier in step 1672. If the sets of matching data are already separated, then the method ends. If the sets of matching data are not currently in different entity identifiers, then in step 1674 the data records identified by I.subtext.1 and I. subtext.2 as well as the other sets of matching data are removed from the entity identifier containing the sets of matching data identified by I. subtext.1 and I. subtext.2. Then, in step 1676, the match/link operation, as described above, is performed on each set of matching data removed from the entity identifier. The match/link operation may re-associate those sets of matching data previously in the entity identifier with other sets of matching data or reestablish the entity identifier without either I. subtext.1 or I. subtext.2. Now, a method for deleting sets of matching data in accordance with the invention will be described.

Figure 17:
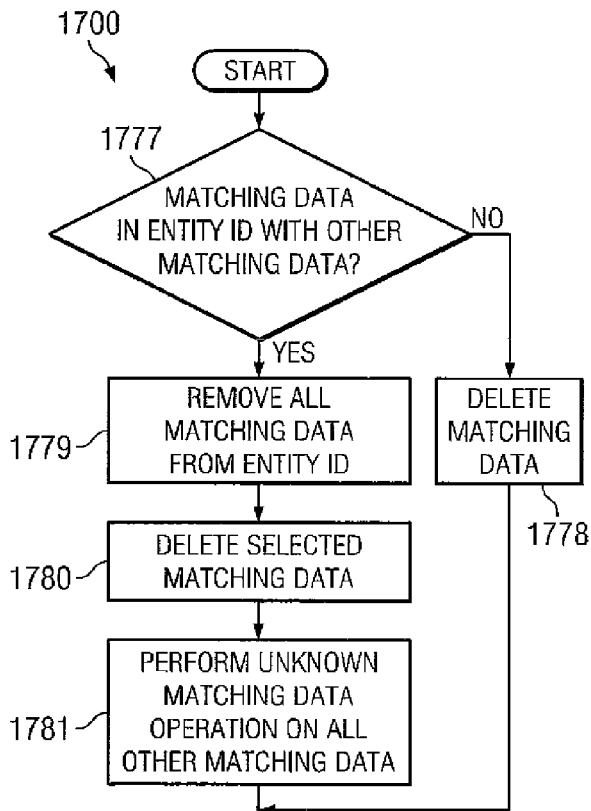
FIG. 17 is a flowchart illustrating one embodiment of a method for deleting matching data from a search hub index system.

FIG. 17 is a flowchart illustrating one embodiment of method 1700 for deleting a sets of matching data in accordance with various embodiments. In step 1777, search hub 502 index system 750 determines if the set of matching data to be deleted is located within an entity identifier with other sets of matching data. If there are no other sets of matching data in the entity identifier, then in step 1778, the set of matching data may be deleted and the method is completed. If there are other sets of matching data associated with the set of matching data to be deleted, then in step 1779, all of the sets of matching data are removed from the entity identifier, and in step 1780, the selected set of matching data may be deleted. Then in step 1781, a match/link operation, as described above, is executed for the other sets of matching data previously in the entity identifier. The match/link operation may re-associate those sets of matching data previously in the entity identifier with other sets of matching data or reestablish the entity identifier without the deleted sets of matching data. Now, a method for querying search hub 502 index system 750 for sets of matching data and querying search hub 502 index system 750 for data from the other control databases will be described.

Figure 18:
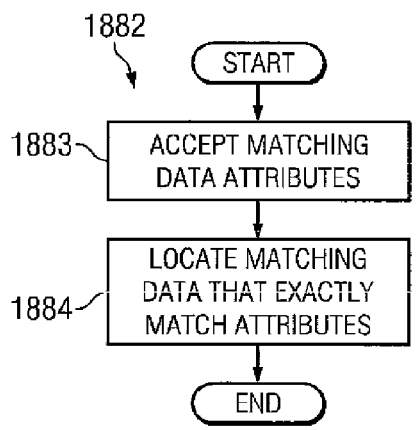
FIG. 18 is a flowchart illustrating one embodiment of a method for querying a search hub index system for matching data about a particular entity

FIG. 18 is a flowchart illustrating one embodiment of method 1882 for querying data exchange 500 for data records about a particular entity. In step 1883, search hub 502 index system 750 accepts a query from the user that contains entity attributes. These attributes correspond to data fields within the sets of matching data stored by search hub 502 index system 750. In step 1884, search hub 502 index system 750 retrieves records 504' corresponding to the sets of matching data which have data fields that match the attributes provided in the query and displays those located data records 504' for the user. The details of the matching method will be described below in method 2000 and illustrated in FIG. 20.

Figure 19:
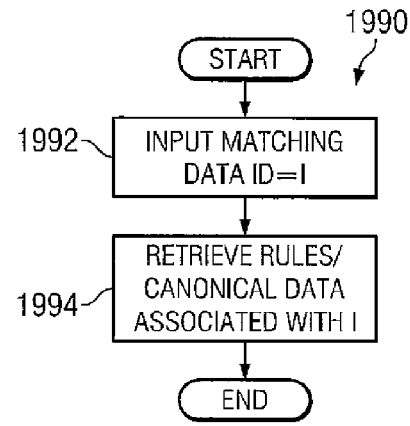
FIG. 19 is a flowchart illustrating one embodiment of a method for querying a search hub index system to locate information.

FIG. 19 is a flowchart illustrating one embodiment of method 1990 for querying data exchange 500 to locate information in the databases of the data exchange 500. In step 1992, the operator may input file names and corresponding values for fields maintained in sets of matching data of the database. In step 1994, search hub 502 index system 750 may retrieve any information from the control databases relating to the data record identifier I. For example, if the user queries search hub 502 index system 750 about rules in the rules database containing identifier 1, search hub 502 index system 750 may return the identity rule I=M and the non-identity rule I.notequal.N. Now, a method for computing the match operation data records in search hub 502 index system 750 database based on a set of query attributes will now be described.

Figure 20:
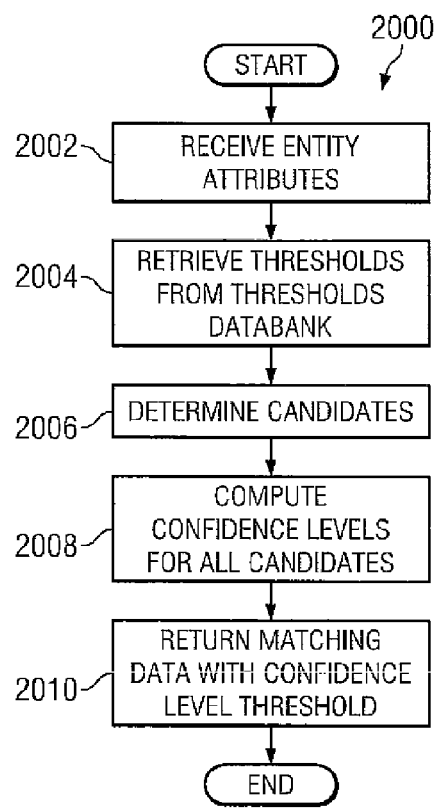
FIG. 20 is a flowchart illustrating one embodiment of a method for querying records.

FIG. 20 is a flowchart illustrating one embodiment of method 2000 for finding matching data records in the search hub 502 index system 750 database based on a set of query attributes in accordance with various embodiments. In step 2002, search hub 502 index system 750 accepts a query in the form of a list of entity attributes and associated values. Examples of entity attributes in a health care embodiment could be patient number, first name, last name, or phone number, or if the database is a parts inventory, the part number, or the manufacturer for the part. In step 2004, the threshold being used by the matching operation may be retrieved from the thresholds database shown in FIG. 8. As described above, the thresholds database permits different threshold levels to be used depending on how close a match is desired by the operator.

Once the threshold has been set, in step 2006, a plurality of candidates may be retrieved. To select the candidates, the input attributes are divided into combinations of attributes, such as the last name and phone number of the patient, the first name and last name of a patient, and the first name and phone number of the patient. The sets of matching data in the search hub 502 index system 750 database are exactly matched against each combination of attributes to generate a plurality of candidate sets of matching data. Determining candidates from several combinations of attributes permits more fault tolerance because a set of matching data may have a misspelled last name, but will still be a candidate because the combination of the first name and the phone number will locate the set of matching data. Thus, a misspelling of one attribute will not prevent the set of matching data from being a candidate. Once the group of candidates has been determined, the confidence level for each candidate data record may be calculated at step 2008.

The confidence level may be calculated based on a scoring routine, which may use historical data about a particular attribute, such as a last address. In some embodiments, the confidence level can be calculated using method 2100 as discussed herein with reference to FIG. 21. Thus, if the current address and past addresses match a query, the confidence level is higher than that for a set of matching data with the same current address but a different old address. The scoring routine may also give a higher confidence level to information more likely to indicate the same entity, such as a social security number. The scoring routine may add the confidence level for each attribute to generate a confidence level value for a candidate set of matching data (match score). Once the confidence levels have been calculated, any data records 504' corresponding to sets of matching data with confidence levels higher than the threshold level are displayed for the user in step 2010.

In the past, confidence levels associated with attributes were not determined and assigned automatically. Typically, a highly trained and extremely skilled specialist is needed to set and validate various weights to individual attributes, perhaps with the help of some disparate utilities and programs. As the size, number, and complexity of data records continue to grow, there is a continuing need for better solutions in generating weights for measuring the likelihood of records belonging to the same entity.

Various embodiments disclosed herein provide a new way of measuring the likelihood of records belonging to the same entity in a fast, scalable, objective, and reproducible manner. More specifically, embodiments of the invention provide a system and method for automatic weight generation, useful in measuring the closeness of a match across data records 504' from various information sources. Some embodiments combine utilities and programs with a search engine to perform complex weight generation across data record matching (e.g., from multiple data sources) with little or no user intervention. According to one embodiment of the invention, the search engine can be utilized in finding matching sets of matching data in search hub 502 index system 750 database (and the corresponding data records 504') described above with reference to FIGS. 6-19.

Figure 21:
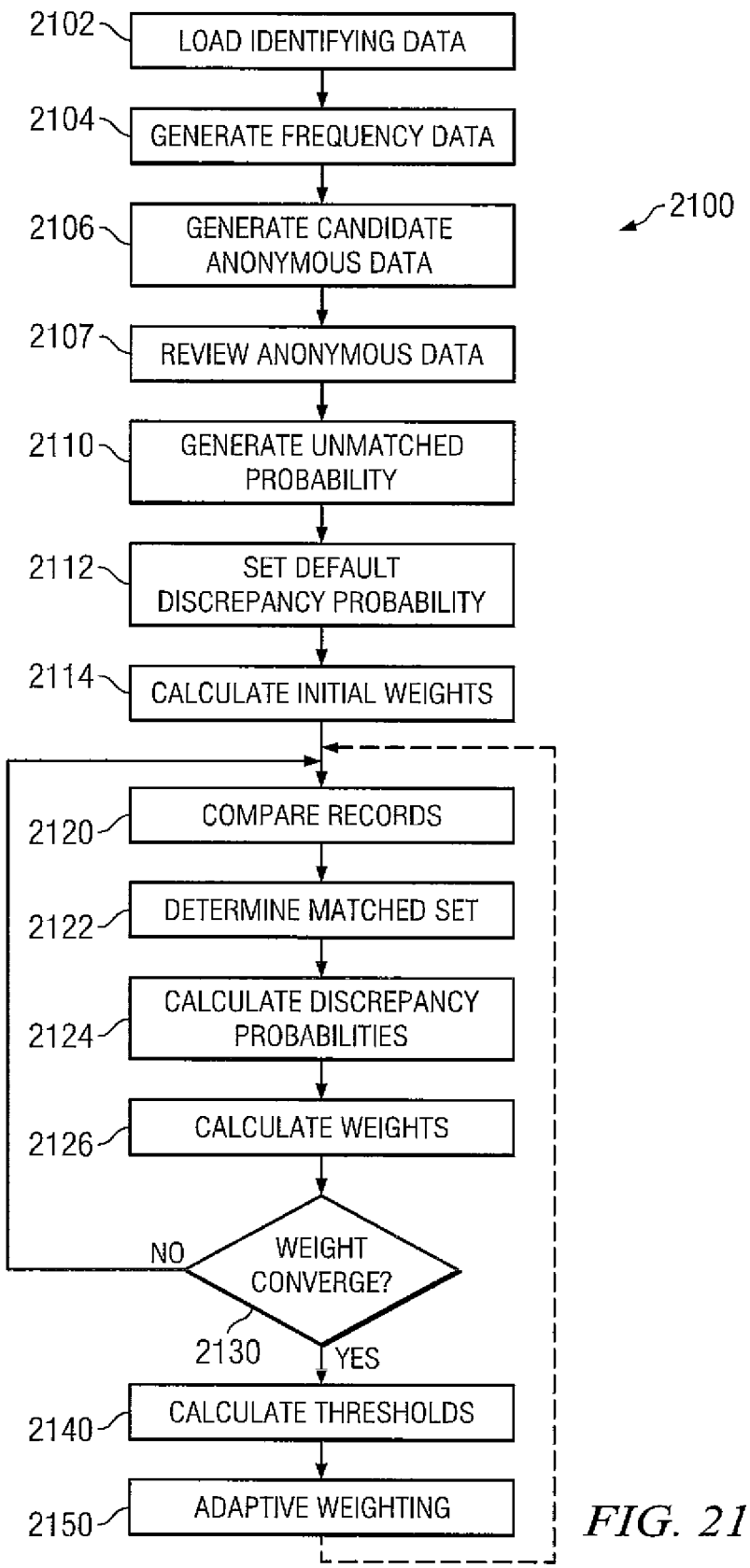
FIG. 21 is a flowchart illustrating one embodiment of a method for generating weights associated with attributes of matching data.

FIG. 21 is a flowchart illustrating one embodiment of weight generation process 2100 according to some embodiments. One skilled in the art will appreciate that not all steps of process 2100 need to be performed and that other implementations are also possible.

In the embodiment shown in FIG. 21, step 2102 includes loading matching data from a plurality of data sources. In some embodiments, a subroutine implementing step 2102 can load all or a portion of data from a database or a collection of data (e.g., a file containing a set of matching data). Within this disclosure, the term "subroutine" generally refers to a module of computer-executable programming instructions that can be used repeatedly. Exemplary matching data for an entity might include fields or attributes like first name, last name, address, phone number, social security number (SSN), date of birth, etc. for identifying a person. For the sake of illustration, attributes involved in process 2100 are referred to herein as a selection of attributes. As one skilled in the art can appreciate, the selection of attributes to be used in an automatic weight generation process according to various embodiments disclosed herein is configurable and can vary from implementation to implementation.

Step 2104 includes generating frequency data for certain attributes in the selection of attributes involved in process 2100. In one embodiment, a subroutine implementing step 2104 can identify the occurrence and frequency of certain types of attributes (e.g., more than one people could have the same last name and/or the same birthday). The generation of frequency data is not required for all attribute types (e.g., the frequency of SSN does not change in order of magnitude from person to person).

Step 2106 includes generating candidate anonymous data. In some embodiments, a subroutine implementing step 2106 can locate and eliminate erroneous data, including those which might have been entered by mistake or default (e.g., a default value for an unknown person's "Last Name" may be "Doe" and a default "Date of Birth" may have a value of 99/99/9999). The subroutine may look for continuity (e.g., "123 Home") and/or factoring out common values (e.g., "John Doe").

Step 2107 includes reviewing candidate anonymous data generated in step 2106. In some embodiments, a subroutine implementing step 2107 can display an organized list of anonymous data to the user for optional inclusion/exclusion from being considered anonymous. Some embodiments can be utilized by search hub 502 index system 750 described above. As mentioned before, anonymous name database 884 permits search hub 502 index system 750 to automatically recognize names that should be ignored. The subroutine implementing step 2107 can provide the user with the ability to add, modify, or otherwise edit the anonymous name database 884.

Step 2110 includes creating or generating the unmatched probability data for the selection of attributes involved in process 2100. In some embodiments, a subroutine implementing step 2110 can generate, for each attribute, the unmatched probability which indicates, for each particular attribute, the likelihood that the attributes agree, partially agree, or disagree when the sets of matching data pulled do not belong to the same person. As an example, suppose sets of matching data corresponding to data records Record.001 and Record.002 have an agreement or a partial agreement on a particular attribute TelephoneNumber (i.e., they have the same or similar telephone numbers). According to some embodiments, a subroutine implementing step 2110 can generate the unmatched probability which indicates the likelihood of obtaining similar phone numbers when the entity associated with Record.001 and the entity associated with Record.002 are not the same (i.e., the probability that phone numbers are similar at random).

As mentioned above, attributes can be in different types. To accommodate different types of attributes, various comparison techniques can be utilized to implement step 2110. Some embodiments include comparison functions implementing attribute frequency counts and random re-sampling. Examples of both techniques will be described below in detail. In some embodiments, a comparison function may utilize a hybrid of these techniques. The determination as to what comparison technique to utilize may depend upon the types of attribute values. For example, a first comparison function may be applied to attributes with discrete values such as "gender", a second comparison function may be applied to attributes having a finite range of values such as "birthday", and so on. According to some embodiments, a comparison can be done by measuring a distance between two numbers for certain attributes such as phone numbers. In this example, the term "distance" refers to a degree of difference in digits (e.g., the difference between a first telephone number 5125551235 and a second telephone number 5125551238 may be a distance of one as the phone numbers are off by one digit). In this way, the closeness of two sets of matching data can be associatively reflected in terms of the closeness of their telephone numbers.

In some embodiments, a subroutine implementing random re-sampling operates to create sample pairs which are randomly unmatched. The chance of matching a randomly selected pair can be statistically insignificant. The unmatched random sample pairs can then be utilized to calculate the unmatched probability for each attribute in process 2100. Unlike prior systems which simply interpolate the likely intermediate point between an exact match and a mismatch, embodiments of the invention calculate the actual mid points in an automatic process. In this way, very accurate weights can be developed for a plurality of comparison functions, including very complex comparison functions such as multi-dimensional comparisons.

The ability of various embodiments to automatically generate weights can enhance the accuracy and performance of a matching operation. This can be particularly advantageous in determining the correct final match score under certain circumstances (e.g., multi-dimensional comparisons). To illustrate this point, as an example, suppose in comparing two sets of matching data, a weight of 3 is given because the name matches and a weight of 4 is given because the birthday matches, so the final result of this combined (i.e., name-birthday) comparison has a weight of 7. However, these two attributes are conditionally uncorrelated, which means that knowing one does not necessarily give weight to the other (i.e., the scores add to give the final score). Knowing that two different people are named "John Smith" does not indicate whether the birthdays should or should not match. On the other hand, suppose two different people have addresses that match. The chance or likelihood that they would also have phone numbers that match would be higher. Thus, the result from this second (i.e., address-phone) comparison is not additive (i.e. if the address alone weight is 4 and the phone alone weight is 3, then the address-plus-phone weight may be 5, which is less than the sum).

Some embodiments may provide multi-dimension scores in the form of a multi-dimensional array of conditions, each has a weight to a condition associated with the attributes (e.g., "address exact, phone missing," "address off a little bit, phone missing," "address exact, phone exact," etc.). As an example, each attribute might have a weight which goes from −1: missing, 0: exact, 1: a little bit off, etc. In one embodiment, attributes that are conditionally correlated may be ignored.

Step 2112 includes setting the default discrepancy weights for the selection of attributes involved process 2100. A subroutine implementing step 2112 may operate to provide a set of default values which represent the data quality of a database from which data is loaded in step 2102. Additionally, the subroutine may provide a user with the ability to set default values reflecting what the user believes to be representative of the data quality. That is, as an option, a person is allowed to specify how good the data is. As it will be described below with reference to step 2124, the true discrepancy probabilities are calculated through an iteration process. The default discrepancy probabilities assigned in step 2112 are used to start the iteration process, which, in this example, begins at step 2120.

Another option to start the iteration process is to use existing rules. That is, instead of starting from scratch, some embodiments can start from a working search hub 502 that has been in operation for some time. People make decisions as they use search hub 502. Search hub 502 is configured to record those decisions and may already have a set of matched sets of matching data that has been accumulated over time. Thus, such an existing search hub 502 may have information which reflects actual human experience in scoring its sets of matching data. Some embodiments can use all or part of those decisions in process 2100 (e.g., to seed the iteration process which begins at step 2120). Even if additional data source(s) is/are to be added, it might be useful to start process 2100 with an existing search hub 502 and utilize a sets of matching data in search hub 502 already reviewed in the past as they would have some relation to the sets of matching data subject to scoring.

Step 2114 includes calculating the initial weights for the selection of attributes in process 600 based upon probabilities determined in steps 2110 and 2112. In some embodiments, a subroutine implementing step 2114 can calculate the initial weight (Wi) of an attribute using a first probability (P(~|U)) determined in step 2110 and a second probability (P(~|M)) determined in step 2112 such that Wi=log n(P(~|M)/P(~|U)). This is done for each attribute prior to starting the iteration process described below.

Step 2120 includes comparing and matching sets of matching data using weights automatically generated thus far. In some embodiments, a subroutine implementing step 2120 can include a software engine configured to perform the record comparison. Initially, the software engine utilizes the weights generated in step 2114 to compare sets of matching data within the file and calculate scores on each pair of matching data. As an example, a high score may mean that matched pairs of matching data look alike and a low score may mean that they do not look alike.

Step 2122 includes determining a new matched set. In one embodiment, a subroutine implementing step 2122 is translatable to evaluate each attribute in process 2100 and determine whether to update any probabilities associated therewith. To do so, an attribute under evaluation is removed from consideration in the determination of matched pairs. For example, suppose the probability of SSN is under evaluation, SSN is taken or left out of the mix (e.g., by setting the weight of SSN to zero) when determining a matched set. This takes the bias out when computing the probability of SSN and is done separately for each attribute. In one embodiment, results are stored separately for each attribute. Thus, if desired, final scores can be calculated based on a specific attribute or attributes.

For pairs of matching data to be in a matched set, they have to at least meet a certain threshold value. In one embodiment, a very low threshold value (e.g., 6) is used to link the sets of matching data. This allows a large number of candidates for comparison. According to embodiments of the invention, the thresholds can be completely configurable. For example, if data loaded in step 2102 have many different attributes, the threshold could be set a littler higher.

In one embodiment, for sets of matching data to be in a matched pair they have to meet at least two thresholds. The first one pertains to the overall match score and the second one pertains to a percentage of a possible match. For example, suppose scoring set of matching data one ("R1") against itself results a 10. Thus, the most any record can score against set of matching data R1 is 10. In order to be in the matched pair, sets of matching data would have to score above a certain threshold value (e.g., 6) and has to be a certain percentage (e.g., 95%) of a possible score (e.g., 10). Setting the latter one high (e.g., 95% or more) can result almost identical pairs per attribute type.

As another example, suppose scoring set of matching data two ("R2") against itself results a 12. Thus, the most any set of matching data can score against R1 is 10 and the most any set of matching data can score against R2 is 12. Assume further that SSN of R1 has a score of 4 and SSN of R2 has a score of 3. In this example, SSN is representative of an attribute whose weight is reset to zero or otherwise removed from consideration:

|  | R1 | R2 |
| --- | --- | --- |
| Maximum possible score per set of matching data | 10.0 | 12.0 |
| SSN | 4.0 | 3.0 |
| Maximum possible score with SSN removed | 6.0 | 9.0 |

In the above embodiment, the score associated with SSN is subtracted from the score of the set of matching data. Thus, with SSN removed from consideration, the best a set of matching data can score against R1 is 6 and the best a set of matching data can score against R2 is 9. When comparing without SSN, a set of matching data would need to have 95% of 6 in order to be in the matched pair. Next, an attribute "Name" having a weight of 5 is subtracted out. Similarly, an attribute "address" having a weight of 6 is subtracted out. This generates a match score with each attribute removed and results a matched pair which is unique to each attribute (e.g., a matched set which is unique to SSN is a group of matching data that have good agreement on everything except for SSN). That is, a new matched pair for a particular attribute is calculated by eliminating that particular attribute from the consideration, calculating a new matched pair for that attribute, and finding and removing errors. The other evidence (e.g., attributes) besides SSN would indicate whether these sets of matching data are the same. The new matched pair is then used for recalculating the discrepancy weights in step 624.

Step 2124 includes determining the discrepancy probabilities for the new matched pair. In one embodiment, a subroutine implementing step 2124 is translatable to take the matched pairs and calculate the probabilities of matching with respect to each attribute (e.g., how many are exact matches, how many are one off, how many are two off, etc.). This can be done for all attributes.

Step 2126 includes calculating and creating a new set of weights based upon updates generated in step 2122 and step 2124. In one embodiment, a subroutine implementing step 2126 is translatable to calculate the new weights based upon the unmatched probability tables and the newly updated discrepancy tables.

Step 2130 includes testing for convergence with respect to a threshold. The above-described portion of process 2100 automatically repeats from step 2120 to step 2130 until the weights converge to their final value (i.e., until the difference between new weights generated in step 2126 and old weights used in step 2120 are less than a predetermined amount). Unlike the old rule-based approach, the score-based approach described above is a very robust way of generating weights and calculating a matched pair.

In some embodiments, process 2100 further includes step 2140 for determining candidate thresholds for a real-time data exchange 500 based upon the newly generated sets of weights. In some embodiments, candidate thresholds include nominal auto-link threshold and clerical-review threshold. The former is related to false positives and the latter is related to false negatives. The newly generated sets of weights can be applied to find two candidate error rates, which specify the acceptable limits of false-positives and false-negatives (e.g., 1 in 100,000). As an example, in one embodiment, a software module can operate to establish the maximum number that each set of matching data can score for itself. Thus, if a second set of matching data somehow scores higher than the maximum number of a first set of matching data, it is a false-positive. In one embodiment, a person is allowed to review the candidate pairs and adjust if desired.

In some embodiments, process 2100 further includes step 2150 for creating tables for adaptive weighting. As an example, suppose sets of matching data in a database have been compared, matched up, and linked via process 2100. The results of people actually reviewing the linking would be useful information to feed into process 2100 and perhaps influence the determination on the matched and unmatched sets of matching data. Thus, in one embodiment, a software module implementing step 2150 is translatable to record manual review results and then re-do the iterative estimation process using the same sets of matching data, incorporating the results from the manual review. This can further refine the accuracy and performance of the real-time data exchange 500.

A data exchange 500 implementing one embodiment of the method of automatic weight generation for probabilistic matching will now be described in detail. In one embodiment, the data exchange 500 may allow a user to select anonymous values from a list generated by profiling the data. For example, for attributes like SSN, Phone Number, Zip code, and alternate ID, the anonymous values are determined by frequency. Values are marked as anonymous if their frequency is greater than a configurable multiplier of the average frequency. As a more specific example, if the average phone number occurs 1.2 times, then a value is flagged as anonymous if it has occurred more than f_phone*1.2 times.

In various embodiments, a frequency is computed for each birth date and anonymous values are identified by comparing the frequency of the birth date to the average frequency of adjacent dates. In some embodiments, a software module may operate to, for each birth date, compute an average frequency for the 3 dates preceding the birth date, and the 3 dates that follow the birth date (i.e., if this date is either the first or the last, take the average of the 6 dates that follow or precede respectively). The software module may flag the birth data as anonymous if its frequency is greater than f_bdate*the average frequency. For names, the software module may compute the frequency of each name token and filter out the common first and last names using a list of names from, for example, the census department or other external list. After removing the common names, the software module may compute the average name frequency and flag any name as anonymous if its frequency is greater than f_name*average name frequency. In addition to the anonymous values that are identified by the frequency calculations, each attribute has a default list of anonymous values that can be modified by the user. For example, for Name the default list would contain "UNKNOWN", and for Phone Number the default list would contains "99999999". The final anonymous list can be reviewed and optionally modified by the user.

One embodiment of the data exchange 500 comprises one or more computer readable media carrying computer-executable instructions translatable to:
 1. Create the unmatched probability tables for all attributes involved in a comparison algorithm.
 2. Set the default discrepancy weights for these attributes.
 3. Calculate the weights based upon these tables.
 4. Run the bulk cross-match.
 5. Determine the matched pair for recalculating the discrepancy weights.
 6. Calculate the discrepancy probabilities.
 7. Calculate the weights based upon the unmatched probability tables and the new discrepancy tables.

8. Tabulate the differences between the new weight table computed in step 7 and the prior table used in the bulk cross-match of step 4.
9. If this difference is larger then repeat beginning at step 4 with the new weight table.
10. Calculate nominal auto-link and clerical-review thresholds.
11. Create tables for adaptive weighting.

These steps can be implemented in a real-time data exchange 500 in many ways. One example is described below with specific details for the purpose of illustration.

Creating Tables for Unmatched-Set Probabilities

Two methods can be used to calculate unmatched probabilities. Here, attribute frequency counts is used for name, gender, and e-mail address, and bootstrap sampling is used for SSN, address, phone, and alt-ID. The birth date comparison is a hybrid which uses both frequency (only for the year) and bootstrap sampling.

Before the unmatched tables can be created by bootstrap sampling, a large table of randomly selected member pairs can be created. This table may contain several million pairs (the number of bootstrap pairs may be a parameter, for example, "numboot", whose default value is 3 million). The only requirement is that the pairs point to different members (e.g., memrecno_k_1 <> memrecno_k_2 for all pairs k=1, 2, . . . , numboot). An example of the table containing randomly selected member pairs is illustrated in Table 1.

TABLE 1

Bootstrap pairs

| memrecno_1_1 | memrecno_1_2 |
| memrecno_2_1 | memrecno_2_2 |
| ... | ... |
| memrecno_numboot_1 | memrecno_numboot_2 |

The bootstrap pairs may be saved for testing the weight generation process several times with the same random set. Otherwise, it is not necessary to save them. Various known storage schemes (e.g., floating point, integer, etc.) can be utilized to store tables disclosed herein. For clarity, some are listed as separate tables. However, they can be combined where appropriate.

Default Discrepancy Probabilities

The true discrepancy probabilities are calculated by iteration through the bulk cross-match. However, to start the process, a weight table is needed to perform the cross match. This table is created using the true unmatched probabilities along with a default set of discrepancy probabilities. If there is a prior weight table which is applicable to the particular data collection, it may be used to start the process.

The default discrepancy tables are calculated analytically based upon an input "data quality" parameter. This parameter is called q_d and is equal to 0.05 for normal data, 0.20 for bad data, and 0.01 for good data. The default should be 0.05 for normal data.

Determining the Matched Pair

Based upon a bulk-cross match, all unique pairs are selected that score greater than a threshold T_mat (e.g., 5 may be the default value). This is the candidate matched pair. No links are formed. For each attribute used in comparison, a subset of this set is selected for calculating the discrepancy probabilities for that attribute. The selection of this subset is based upon the component scores from the comparison. Table 2 exemplifies information required for each pair in the candidate matched set:

TABLE 2

Detailed scoring information for each pair

| Comparison Attribute | Component Score | Member 1 Information | Member 2 Information | Auxiliary Information |
|---|---|---|---|---|
| Name | s_n | i1_n | i2_n | Num exact match |
| | | | | Num phonetic match |
| | | | | Num initial match |
| | | | | Tokens compared |
| SSN | s_s | i1_s | i2_s | Edit distance |
| Birth date | s_b | i1_b | i2_b | Edit distance |
| Address/phone | s_a | i1_a | i2_a | Addr edit dist Phone edit dist |
| Gender | s_g | i1_g | i2_g | |
| e-mail | s_e | i1_e | i2_e | |
| Total | s | i1 | i2 | |

Here, s is the total score comparing member 1 to member 2 and is the sum of the component scores:

$$s = s\_n + s\_s + s\_b + s\_a + s\_g + s\_e$$

The amount of "information" for the members is obtained by scoring the member against itself. For member 1, i1 is the total score comparing it to itself, and i2 is the score obtained by comparing member 2 to itself. The components for these information scores are also needed. This auxiliary information provides details on the comparison between the two members. These details are also needed for calculating the discrepancy probabilities.

For each of the sections below, a subset of the matched pair is selected for attributes discrepancy calculations. The selection of the subset is made in a manner to ensure that the attribute in question does not impact the selection. That is, these are attribute-specific subsets. As an example, to get the name subset, only pairs whose normalized score without name is large are selected, thus generating an unbiased set. The normalization used is the smallest information for the two members. For example, $$snorm\_n = (s - s\_n) / \min((i1 - i1\_n), (i2 - i2\_n))$$

is greater than a threshold T_norm (with an exemplary default of 0.95) and s−s_n is greater than T_absolute (with an exemplary default value of 4)

as the name subset of the matched pair which is used in the discrepancy probability calculations for name.

Similarly, $$snorm\_s = (s - s\_s) / \min((i1 - i1\_s), (i2 - i2\_s))$$

is the normalized score for SSN computations, and the SSN subset of the matched set is all pairs where snorm_s is greater than T_norm and s−s_s is greater than T_absolute.

The weight computation may use the name matched pair for attribute suffix.

Weight Calculation

Information from the unmatched set probabilities and the matched pair probabilities are combined to form the actual weights. Various embodiments of weight calculation will be described in more details below with respect to various data types.

Convergence

In estimating weights, the process iterates though successive bulk cross-matches until the weights converge to their final value. With the data exchange 500 of some embodiments, the weights convergence takes at most three iterations. After each iteration, the difference between the weight table just computed (the new one) and the one used to begin the iteration (the old one) is computed. It is not necessary to look at all the weights as they may not all be affected by change(s) in calculation. Table 3 exemplifies the information collected by the data exchange 500 for each attribute. As an example, for convergence, the difference in the second column ("Value") of Table 3 should be less than a predetermined amount (e.g., parameter conv_tol with a default=0.2) for all rows.

TABLE 3

Weight comparison detail

| Attribute | Value |
|---|---|
| Name | Between the two weight tables (old and new), calculate the absolute value of the difference on the 1) the disagreement weights, 2) the default name weight, and 3) the default phonetic weight. Calculate the maximum of these three differences. |
| SSN | Calculate the absolute value of the difference between the two weight tables (10 values). Take the maximum of these differences |
| Birth date | Calculate the absolute value of the difference between the mismatch weights for each weight table. Take the maximum of these differences. |
| Address by phone | Calculate the absolute value of the difference between the two weight tables. Take the maximum of these differences. |
| Gender | Calculate the absolute value of the difference between the mismatch weights from the two weight tables. |
| e-mail | Calculate the absolute value of the difference between the mismatch weights from the two weight tables. |
| Suffix | Ignore |

Threshold Calculation

After the weights are established by an embodiment of the automatic weight generation process described above, candidate thresholds can then be calculated for the real-time data exchange 500 (e.g., an operational hub). A user of the real-time data exchange 500 can start with these candidate thresholds, review tasks and linkages of data records using these candidate thresholds, and determine the final thresholds for the data exchange 500.

As mentioned above, at least two types of candidate thresholds can be generated according to one embodiment of the invention: auto-link threshold and clerical-review threshold. The candidate auto-link threshold defines file size and allowable false-positive rate. For example, let fpr be the allowable false-positive rate (e.g., default value $10^{-5}$), and num be the number of records in the dataset. Then the candidate auto-link threshold is $$\text{thresh\_}al = -\ln[-\ln(1-fpr)/\text{num}]/\ln(10)$$

where ln is the natural (base e) logarithm.

The candidate clerical-review threshold is set based upon the desired false-negative rate. Let fnr be the desired value (e.g., if it is desired to have 95% of the duplicates to score above the clerical-review threshold, set the default to be 0.05). This value depends upon the weights calculated for matching, the fraction of the time each attribute has a valid value, and the distribution of those values. A simple bootstrap procedure can be used to determine the empirical distribution of matched-pair scores and calculate the clerical-review threshold from this distribution.

For this bootstrap, the data exchange 500 generates a list of random members, calculates the information for each member, and forms an empirical distribution from this sample.

The bootstrap procedure comprises selecting numebt random members, with potential redundancy, in the database. A portion of the bootstrap pairs created earlier can be reused (see Table 1: Bootstrap pairs, first column, memrecno_1, memrecno_2, . . . , memrecno_numebt). Each member is scored against itself (i.e., compute the information for the member—see the Determining the Matched Set section above). Let s_1, s_2, . . . , s_numebt be the scores thus generated, s_min be the minimum of these scores, and s_max be the maximum of these scores. A table can then be created from s_min to s_max, incrementing by 0.1, to bin the scores. Table 4 below exemplifies this score distribution table, which can have $n=(s\_max-s\_min)/0.1$ rows:

TABLE 4

Random set score distribution

| Value | Count | Frequency |
|---|---|---|
| s_min | c_1 = number of s_i equal to s_min | f_1 = c_1/numebt |
| s_min + 0.1 | c_2 = number of s_i equal to s_min + 0.1 | f_2 = c_2/numebt |
| s_min + 0.2 | c_3 = number of s_i equal to s_min + 0.2 | f_3 = c_3/numebt |
| . . . | . . . | . . . |
| s_max | c_n = number of s_i equal to s_max | f_n = c_n/numebt |

Now, let j be the first index such that $$f\_1 + f\_2 + \ldots + f\_j > fnr$$

then the candidate clerical-review threshold is $$\text{thresh\_}cl = s\_min + (j-1)*0.1$$

Adaptive Update Tables

The adaptive update tables are populated during run time of the real-time data exchange 500 (e.g., an operational hub). They contain information on matched pairs and unmatched pairs which have been manually flagged by a user during previous review session(s). As described above, the results of people actually reviewing the linking would be useful information to feed into the automatic weight generation process and perhaps influence the determination on the matched and unmatched pairs. In some embodiments, the real-time data exchange 500 may record manual review results and run the iterative estimation process from step 4 to step 9 using the same set of data and incorporating the results from the manual review. This can further refine the accuracy and performance of the real-time data exchange 500.

With reference again to FIG. 6, in step 606, search hub 502 can normalize the pushed data in some embodiments such as hybrid data exchange 500 of FIG. 5. Normalizing the pushed data can involve characterizing the response a series of test searches (with varying levels of stringency) cause from each set of pushed data (corresponding to each particular participant 504). Search hub 502 can start the test by stringently comparing pushed data from each participant 504 to the test search criteria. Matches for each pushed data set can be examined for false negatives. Search hub 502 can make the test search less stringent by, in some embodiments, decreasing the threshold for the test search and repeating the test search. By doing so, search hub 502 will tend to deem more records 504' as matching the search criteria. The false negative rates for the data sets will to tend to drop as a result. A comparison of the sets of results for new, potentially matching records 504' can characterize the difference in the false negative rate of the data set for the current and prior thresholds.

Search hub 502 can successively reduce the threshold, repeat the test search, and again characterize the decrease in the false negative rate. At some point, when the threshold of the test search has dropped sufficiently, it becomes likely that all records having any reasonable chance of matching the test search criteria will be deemed as matching the search criteria by search hub 502. From the collection of responses, search hub can characterize the false negative rate of each data set as a function of test threshold. In some embodiments, search results produced by participants 504 can be normalized in a similar manner.

In step 610, search hubs of some embodiments can receive a search request including, in some embodiments, a desired confidence level and a desired maximum false positive rate selected by the requestor 504A. In some embodiments, search hub 502 can include features for monitoring which entities are requesting searches, which subjects searches concern, auditing various searches, etc. In step 612, search hub 502 can reformulate the search request to a form which can be used to search all pushed data sets (or, in some embodiments, participants 504). The reformulation of the search request can involve modifying it to account for various inconsistencies in the pushed data.

In step 614, for each set of matching data, search hub 502 can either choose a default threshold or choose a threshold based on the user selected maximum negative rate to score the set of matching data. Search hub 502 can compare each pushed data set to the search criteria to identify records 504' which match the search criteria (according to the threshold in use). In step 614, search hub 504 can retrieve the records of interest from participants 504 or, if the records 504' have been pushed to search hub 502, from memory. Participants 504 may protect their records 504' in accordance with their data security and sharing policies by denying request for the records 504' or by not pushing related data to search hub 502 (thereby blinding search hub 502 to the existence of such records 504'). In embodiments in which participants 504 search themselves, in step 614, search hub 502 can request that participants 504 conduct an appropriate search. If particular participants 504 have data security or sharing policies which constrain them from sharing certain records, or data, participants 504 can deny retrieval requests from search hub 502 as desired.

In step 616, search hub 502 can receive sets of search results including various records 504 from various participants 504. As disclosed with reference to the normalization of the pushed data sets in step 606, in some embodiments, the selection (and satisfaction) of a maximum false negative rate may cause an increase in the number of records 504' returned as matching the criteria of a search. With an increase in the size of the search results, it can sometimes be expected that more false positives will be present in the results. In some embodiments, a superset of the desired results (including these false positives) can be returned to search requestor 504A. Requestor 504A can then discard any records the requestor determines are false positives.

The decision of how to balance false positives (the size of the result set) and false negatives (the completeness of the result set) can be decided by requestor 504A. In some embodiments, data exchanges 200, 300, 400, or 500 can be used to protect citizens from terrorist activity. Many requestors 504A might, under these circumstances, consider it more important to obtain sufficiently wide search responses to help ensure that no possible terrorist initiative slips through as a false negative. False positives contained in the less stringent results will possibly consume time to investigate and discard. This affect, for some requestors 504A, can be outweighed by the potential impact of missing the chance to stop a possible attack. In another embodiment, a lower-level law enforcement agency can use data exchange 200, 300, 400, or 500 to investigate suspects, persons of interest, etc. In this embodiment, requestor 504A can interrogate criminal records 504' but may not want to be pestered with streams of irrelevant data regarding every minor offence committed by the suspect. In this embodiment, requestor 504A might choose to tolerate a certain false negative rate.

In some embodiments, in step 617, search hub 504 can examine the returned records to determine whether false positives are present in the records. If so, search hub 502 may remove some or all of the false positives, as desired. Systems and methods for detecting and correcting false positives are disclosed in co-pending, co-owned, U.S. patent application Ser. No. 11/521,946, now U.S. Pat. No. 7,698,268 filed on Sep. 15, 2006, by Adams et al., now allowed, entitled "Method and System for Filtering False Positives," the entirety of which is incorporated herein as if set forth in full.

In step 618, search hub 502 can score records 504' received in step 616 to determine which records 504' might correspond to the same subject or entity. The scoring of returned records 504' can be deterministic in some embodiments. Deterministic scoring can involve comparing one or more fields in the matching data associated with records 504' with the search criteria and determining that a match occurs when the data in the field exactly matches the search criteria. If a first compared field is only a close, but not exact, match some embodiments of a deterministic scoring algorithm can compare another field to determine whether records 504' match the search criteria.

In various embodiments, the scoring of returned records 504' by search hub 502 can be probabilistic. In various embodiments, probabilistic scoring can be based on a combination of set theory and indexes/schemas. Systems and methods for probabilistic scoring of search results are disclosed in co-pending, co-owned, U.S. patent application Ser. No. 11/809,792, filed on Jun. 1, 2007, by Schumacher et al., now allowed, entitled "A System And Method For Automatic Weight Generation For Probabilistic Matching," the entirety of which is incorporated herein as if set forth in full. Probabilistic scoring algorithms scale well and remain manageable even in situations when numerous attributes of records 504' are searched and even were even minor data discrepancies such as misspelling, transposed digits, etc, can cause an otherwise matching record 504' to be rejected as a non-match. Both performance and accuracy of probabilistic scoring algorithms remain efficient, fast, robust, and dependable even as data exchange 500 becomes larger and complex.

Search hub 502, in step 620, can examine matching records 504' to determine whether any discrepancies between the data contained therein exist. When matching records 504' have discrepancies, search hub 502 can determine which record 504' most likely contains better data. Search hub 502 can correct the discrepancies in step 620. Systems and methods for correcting such discrepancies are disclosed in co-pending, co-owned, U.S. patent application Ser. No. 11/809,792, filed on Jun. 1, 2007, by Schumacher et al., and entitled A System And Method For Automatic Weight Generation For Probabilistic Matching, the entirety of which is incorporated herein as if set forth in full. In step 622, search hub 502 can join matching records. In step 624, search hub 502 can return the results to the requester with the user selected confidence level, maximum false negative, and maximum false positive rate(s) satisfied.

As disclosed with reference to step 620, search hub 502 can detect and correct discrepancies in the returned records. Search hub can also detect when new data has been entered into one, or more, of the returned records 504' by examining time-stamps, comparing data between versions of the same record 504', parsing change logs, etc. When search hub 502 detects discrepancies, new data, updated data, or data missing from one record 504' but found in another, search hub 502 can synchronize records 504' at various participants 504 in step 626.

To do so, search hub 502 can consult the registry of participants disclosed with reference to step 602. In step 602, as part of participant registration search hub 502 can create entries in the registry related to the data security and sharing policies and protocols of various participants 504. Such entries can indicate whether data from a particular participant 504 may be used to synchronize other participants 504, which participants 504 can be synchronized, which participants 504 cannot be synchronized, etc. Entries in the registry may also indicate whether a particular participant 504 can be synchronized using data from other participants, which other participants 504 can be used to synchronize a particular participant 504, which participants 504 the particular participant 504 can not be synchronized with, etc. In some embodiments, search hub 502 can query various participants 504 to determine whether they can be synchronized with new data from participant 504 at which the new, modified, or corrected data originated.

Regardless of how search hub 502 determines whether to synchronize various participants 504, search hub 502 can push the new data to various participants 504 whom may accept the new data. Search hub 502 can notify participants 504 that new data is available in regards to the particular subject or entity of interest. Participants 504 can be configured to respond to synchronization notices by requesting the new data, or by pulling the new data, from search hub 502. Systems and methods for synchronizing participants are disclosed in U.S. Provisional Patent Application No. 60/920,739, filed on Mar. 29, 2007, by Goldenberg et al., and entitled "Method and System for Synchronization of Data Among Participants," the entirety of which is incorporated herein as if set forth in full.

Some embodiments include features related to master data management (MDM) and to the multi-dimensional expression (MDX) query language. Using MDM helps reduce the occurrence of false positives and false negatives by disciplining the manner in which records 504' are entered and maintained. In some embodiments, MDM principles helps ensure that data is entered in each endpoint system in a consistent and accurate fashion, reducing the occurrence of false positives and negatives due to spelling issues, inconsistent record layout, inconsistent field entry, etc. In some embodiments, each participant 504 can implement the necessary MDM techniques, processes and procedures. If, though, a particular participant 504 does not have the skills or resources to implement MDM, search hub 502 can provide a place to enforce data quality policies. Search hub 502 can assist non-MDM participants 504 take corrective action regarding the quality of their data.

Search hubs 502 of some embodiments have the ability to understand multiple, complex relationships between different types and aspects of the data being shared. Consider an embodiment including data exchange 500 linking different government departments involved in the care of children. Related to any particular child there might be reports documented in records 504' from case workers, physicians, educational psychologists, the police, schools and a range of other pieces of data. Because search hub 502 can understand the relationships between various records 504' related to the child, when a search request is made for data related to the child, search hub 502 can return a comprehensive set of results incorporating data related to the child from all of the relevant sources.

In various embodiments, the ability of search hub 502 to understand relationships can be more extensive than the foregoing embodiment. Consider one embodiment in which a particular record 504' at one participant 504 exists for Marty Franklin who works for the Ajax Corporation, and a particular record 504' exists at another participant 504 for a Martin Franklin who lives on Belle Lane. A search request for data regarding Martin Franklin of Belle Lane might only identify the second record 504' as a match. However, suppose that at each participant 504 records 504' exist indicating that Mr. Franklin is married to Lori Franklin who lives on Belle Lane. In various embodiments this additional data, and the relationship(s) between it and other data, influences the matching algorithms such that the record for Marty Franklin of Ajax Corporation should be included in the search response, since it is likely that if he is married to Lori Franklin who lives on Belle Lane then the two records relate to the same Martin (Marty) Franklin. Embodiments which include algorithms which understand and leverage data relationships can improve accuracy and performance since otherwise the records might have to be manually searched for such relationships and the results updated accordingly. The advantages of embodiments which understand relationships can grow exponentially as the size and complexity of data exchanges grow.

In some embodiments, time to value for various participants 504 can be minimized. Minimizing time to value can maintain or improve participant enthusiasm for data exchanges 200, 300, 400, or 500 of some embodiments. In various embodiments, data exchange 200, 300, 400, or 500 may be subject to a certain amount of dynamism with new participants 504 joining on a regular basis. In some data exchanges, participants 504 may have to validate that they have the necessary IT resources in place and that they are prepared to share their data with other participants 504 before joining the data exchange. A slow or onerous process of registering new participants 504 can have a debilitating effect on the whole data exchange 200, 300, 400, or 500. In some embodiments, which can include hundreds of participants 504, configuring a new participant 504 can be easy to implement and operate if the same data exchange application is used by each participant 504. Using a common data exchange application can also make data exchanges of some embodiments easier to grow.

Some embodiments include data exchanges 200, 300, 400, or 500 implemented across national and language boundaries such as data exchanges involving participants in the European Union, North American Free Trade Act region, etc.

Data exchanges 200, 300, 400, or 500 of some embodiments can implement analytical techniques to support the use of multiple languages, enabling data exchanges 200, 300, 400, and 500 to match, relate and manage data regardless of the language used. Systems and methods for supporting data exchanges 200, 300, 400, and 500 involving multiple languages are disclosed in U.S. Provisional Patent Application No. 60/997,025, filed on Sep. 28, 2008, by Harger et al., and entitled "Method and System for Associating Data Records in Multiple Languages," the entirety of which is incorporated herein as if set forth in full.

Data exchanges 200, 300, 400, and 500 of some embodiments can use indexing techniques to search across hundreds of millions of records 504' and return the results in under a second. In one embodiment, a particular data exchange (a CareSpark RHIO MDX application) serves 2018 participants (18 hospitals and 1200 physicians) and health care related records for 750,000 people. Data exchanges 200, 300, 400, and 500 of some embodiments promise to deliver even higher performance than the CareSpark application.

Various embodiments, allow data exchange participants 504 to share and leverage accurate and consistent data in real-time. Organizations of all types have long known that the quality of decision-making corresponds to the accuracy, extent, and accessibility of the data they receive. The quality of decision-making can also depend on bringing together many different participants 504 thereby generating value in accordance with the synergy generated by the many participants 504.

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the following claims and their legal equivalents.

What is claimed is:

1. A method comprising:
   in a data exchange network including a plurality of nodes in communication with each other, wherein a node is registered with a search hub and constrains itself from sharing payload data with other nodes regarding a first subject, allows itself to share matching data with the other nodes regarding the first subject, and further constrains itself to be separate from the other nodes and wherein the plurality of nodes pushes all, some, or none of the matching data to the search hub or to a record locator service connected to the search hub;
   at the search hub or the record locator service:
      receiving a search request for the first subject from a first node, wherein the search request comprises a confidence level and a maximum false positive rate selected by the first node;
      reformulating the search request to a form usable for searching the pushed data sets to account for inconsistencies in the pushed data sets;
      comparing each pushed data set with search criteria associated with the search request to identify records of interest which match the search criteria in accordance with the confidence level;
      retrieving the records of interest from the plurality of nodes, when the records of interest have been pushed to the search hub or the record locator service, from a memory accessible by the search hub on the record locator service, wherein the retrieving step includes requesting the plurality of nodes including the constrained node to search for records regarding the first subject;
      receiving a set of virtual results from the constrained node including at least some of the matching data and excluding the payload data;
      receiving a set of virtual results from one of the other nodes;
      removing false positives from the results in accordance with the maximum false positive rate selected by the first node;
      determining whether any portions of the results correspond to the first subject;
      when any portion of the results correspond to the first subject, joining the corresponding portions in the search hub; and
      outputting the joined portions of the results to the first node.

2. The method of claim 1 further comprising querying the plurality of nodes including the constrained node using a common query wherein the results are sent in response to the common query.

3. The method of claim 1, further comprising:
   adjusting the confidence level prior or subsequent to the retrieving step.

4. The method of claim 1 further comprising guaranteeing a false positive rate associated with the results.

5. The method of claim 4 further comprising guaranteeing a false negative rate associated with the results.

6. The method of claim 1 further comprising notifying the plurality of nodes of a discrepancy associated with the joined portions.

7. The method of claim 6 further comprising adjusting the joined portions to account for the discrepancy.

8. The method of claim 7 further comprising allowing the nodes to request the adjusted joined portions.

9. The method of claim 7 further comprising sending the adjusted joined portions to the plurality of nodes.

10. The method of claim 1 wherein the joining is a probabilistic joining.

11. The method of claim 1 further comprising normalizing the results before the determining step.

12. The method of claim 1, wherein each of the plurality of nodes chooses, in accordance with their respective data security and sharing policies, what kinds of data and how much data to push to the search hub or to the record locator service.

13. A computer readable memory device storing instructions executable by a machine in a data exchange network including a plurality of nodes in communication with each other, wherein a node is registered with a search hub and constrains itself from sharing payload data with other nodes regarding a first subject, allows itself to share matching data with the other nodes regarding the first subject, and further constrains itself to be separate from the other nodes, wherein the plurality of nodes pushes all, some, or none of the matching data to the search hub or to a record locator service connected to the search hub, and wherein when executed the instructions cause the machine to:
   in response to receiving a search request for the first subject from a first node, wherein the search request comprises a confidence level and a maximum false positive rate selected by the first node, reformulate the search request to a form usable for searching the pushed data sets to account for inconsistencies in the pushed data sets, compare each pushed data set with search criteria associated with the search request to identify records of interest which match the search criteria in accordance with the confidence level;
   retrieve the records of interest from the plurality of nodes when the records of interest have been pushed to the search hub or the record locator service, from a memory accessible by the search hub or the record locator service, wherein the retrieving step includes requesting the plurality of nodes including the constrained node to search for records regarding the first subject;

receive a set of virtual results from the constrained node including at least some of the matching data and excluding the payload data;

receive a set of virtual results from one of the other nodes;

remove false positives from the results in accordance with the maximum false positive rate selected by the first node;

determine whether any portions of the results correspond to the first subject;

when any portion of the results correspond to the first subject, join the corresponding portions in the search hub; and output the joined portions of the results to the first node.

14. The computer readable memory device of claim 13 wherein the instructions are further executable to cause the machine to:

adjust the confidence level prior or subsequent to the retrieving step.

15. The computer readable memory device of claim 13 wherein the joining is a probabilistic joining.

16. The computer readable memory device of claim 13 wherein the instructions are further executable to cause the machine to normalize the results before the determining step.

17. The computer readable memory device of claim 13 wherein the instructions are further executable to cause the machine to guarantee a false positive rate and to guarantee a false negative rate associated with the results.

18. The computer readable memory device of claim 13 wherein the instructions are further executable to cause the machine to query the plurality of nodes including the constrained node using a common query wherein the results are sent in response to the common query.

19. The computer readable memory device of claim 13 wherein the instructions are further executable to cause the machine to notify the plurality of nodes of a discrepancy associated with the joined portions.

20. The computer readable memory device of claim 19 wherein the instructions are further executable to cause the machine to adjust the joined portions to account for the discrepancy.

21. The computer readable memory device of claim 20 wherein the instructions are further executable to cause the machine to allow the nodes to request the adjusted joined portions.

22. The computer readable memory device of claim 20 wherein the instructions are further executable to cause the machine to send the adjusted joined portions to the plurality of nodes.

23. The computer readable memory device of claim 13, wherein each of the plurality of nodes chooses, in accordance with their respective data security and sharing policies, what kinds of data and how much data to push to the search hub or to the record locator service.

24. A system comprising:

a data exchange network including a plurality of nodes in communication with each other; and a search hub in communication with the plurality of nodes, wherein a node constrains itself from sharing payload data with other nodes regarding a first subject, allows itself to share matching data with the other nodes regarding the first subject, and further constrains itself to be separate from the other nodes;

wherein the plurality of nodes pushes all, some, or none of the matching data to the search hub or to a record locator service connected to the search hub; wherein the search hub comprises:

a processor; and at least one computer readable memory device storing instructions executable by the processor which when executed cause the search hub to:

in response to receiving a search request for the first subject from a first node, wherein the search request comprises a confidence level and a maximum false positive rate selected by the first node, reformulate the search request to a form usable for searching the pushed data sets to account for inconsistencies in the pushed data sets, compare each pushed data set with search criteria associated with the search request to identify which match the search criteria in accordance with the confidence level;

retrieve the records of interest from the plurality of nodes when the records of interest have been pushed to the search hub or the record locator service, from a memory accessible by the search hub or the record locator service, wherein the retrieving step includes requesting the plurality of nodes including the constrained node to search for records regarding the first subject;

receive a set of virtual results from the constrained node including at least some of the matching data and excluding the payload data;

receive a set of virtual results from one of the other nodes;

remove false positives from the results in accordance with the maximum false positive rate selected by the first node;

determine whether any portions of the results correspond to the first subject;

when any portion of the results correspond to the first subject, join the corresponding portions; and output the joined portions of the results to the first node.

25. The system of claim 24 wherein the instructions are further executable to cause the search hub to:

adjust the confidence level prior or subsequent to the retrieving step.

26. The system of claim 24 wherein the joining is a probabilistic joining.

27. The system of claim 24 wherein the instructions are further executable to cause the search hub to normalize the results before the determining step.

28. The system of claim 24 wherein the instructions are further executable to cause the search hub to guarantee a false positive rate and to guarantee a false negative rate associated with the results.

29. The system of claim 24 wherein the instructions are further executable to cause the search hub to query the plurality of nodes including the constrained node using a common query wherein the results are sent in response to the common query.

30. The system of claim 24 wherein the instructions are further executable to cause the search hub to notify the plurality of nodes of a discrepancy associated with the joined portions.

31. The system of claim 30 wherein the instructions are further executable to cause the search hub to adjust the joined portions to account for the discrepancy.

32. The system of claim 31 wherein the instructions are further executable to cause the search hub to allow the nodes to request the adjusted joined portions.

33. The system of claim 31 wherein the instructions are further executable to cause the search hub to send the adjusted joined portions to the plurality of nodes.

34. The system of claim 24, wherein each of the plurality of nodes chooses, in accordance with their respective data security and sharing policies, what kinds of data and how much data to push to the search hub or to the record locator service.

* * * * *